United States Patent
Su et al.

(10) Patent No.: US 12,340,491 B2
(45) Date of Patent: Jun. 24, 2025

(54) GENERATING HDR IMAGE FROM CORRESPONDING CAMERA RAW AND SDR IMAGES

(71) Applicant: Dolby Laboratories Licensing Corporation, San Francisco, CA (US)

(72) Inventors: Guan-Ming Su, Fremont, CA (US); Tsung-Wei Huang, Sunnyvale, CA (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/856,979

(22) PCT Filed: Mar. 8, 2023

(86) PCT No.: PCT/US2023/063937
§ 371 (c)(1),
(2) Date: Oct. 15, 2024

(87) PCT Pub. No.: WO2023/205548
PCT Pub. Date: Oct. 26, 2023

(65) Prior Publication Data
US 2025/0117904 A1   Apr. 10, 2025

Related U.S. Application Data

(60) Provisional application No. 63/333,374, filed on Apr. 21, 2022.

(30) Foreign Application Priority Data

Apr. 21, 2022 (EP) .................................. 22169192

(51) Int. Cl.
*G06T 5/00* (2024.01)
*G06T 5/20* (2006.01)
(Continued)

(52) U.S. Cl.
CPC ................. *G06T 5/90* (2024.01); *G06T 5/20* (2013.01); *G06T 5/50* (2013.01); *G06V 10/24* (2022.01);
(Continued)

(58) Field of Classification Search
CPC . G06T 2207/20208; G06T 2207/10024; G06T 5/92; G06T 2207/20012;
(Continued)

(56) References Cited

U.S. PATENT DOCUMENTS 9,264,681 B2 *  2/2016  Gish ....................... H04N 9/67
9,497,456 B2    11/2016  Su
(Continued)

FOREIGN PATENT DOCUMENTS

CN    112200719 A    1/2021
EP      3409015 B1   9/2019
(Continued)

OTHER PUBLICATIONS

Ham, Bumsub, Minsu Cho, and Jean Ponce. "Robust guided image filtering using nonconvex potentials." IEEE transactions on pattern analysis and machine intelligence 40.1 (2017): 192-207.*

(Continued)

*Primary Examiner* — Li Liu

(57) ABSTRACT

Guided filtering is applied, with a camera raw image as a guidance image, to a first image to generate an intermediate image. A dynamic range mapping is performed on the intermediate image to generate a second image of a different dynamic range. The second image is used to generate specific local reshaping function index values for selecting specific local reshaping functions. The specific local reshaping functions are applied to the second image to generate a locally reshaped image.

15 Claims, 10 Drawing Sheets

(51) Int. Cl.
*G06T 5/50* (2006.01)
*G06T 5/90* (2024.01)
*G06V 10/24* (2022.01)

(52) U.S. Cl.
CPC ............... *G06T 2207/20208* (2013.01); *G06T 2207/20221* (2013.01)

(58) Field of Classification Search
CPC ............. G06T 5/90; G06T 2207/20024; G06T 2207/20182; G06T 5/70; H04N 19/117; H04N 19/80
See application file for complete search history.

(56) References Cited

U.S. PATENT DOCUMENTS

| | | | |
|---|---|---|---|
| 10,460,699 | B2 | 10/2019 | Atkins |
| 10,783,620 | B2 | 9/2020 | Chesnokov |
| 11,164,295 | B2 | 11/2021 | Stewart |
| 11,277,627 | B2* | 3/2022 | Song ................. H04N 19/186 |
| 11,962,760 | B2 | 4/2024 | Su |
| 2014/0210847 | A1 | 7/2014 | Knibbeler |
| 2015/0078661 | A1 | 3/2015 | Granados et al. |
| 2019/0104309 | A1* | 4/2019 | Su ................. H04N 19/124 |
| 2019/0147572 | A1* | 5/2019 | Colaitis ................. G09G 5/10 345/589 |
| 2021/0150812 | A1 | 5/2021 | Su |
| 2021/0358089 | A1* | 11/2021 | Wen ................. G06T 5/50 |
| 2022/0053118 | A1 | 2/2022 | Nashizawa |
| 2022/0198625 | A1* | 6/2022 | McElvain ............. G06T 5/70 |
| 2022/0210350 | A1* | 6/2022 | Chondro ............. G06T 5/60 |
| 2023/0370646 | A1* | 11/2023 | Huang ................. G06T 5/92 |
| 2024/0040116 | A1* | 2/2024 | Yin ................. H04N 19/86 |

FOREIGN PATENT DOCUMENTS

| | | |
|---|---|---|
| EP | 3493532 B1 | 1/2021 |
| WO | 2020/210472 A1 | 10/2020 |
| WO | 2021/216767 A1 | 10/2021 |
| WO | 2022/072884 A1 | 4/2022 |

OTHER PUBLICATIONS

"Image parameter values for high dynamic range television for use in production and international programme exchange", Rec. ITU-R BT.2100, Jun. 2017. 16 pages.

Getreuer, Pascal "A Survey of Gaussian Convolution Algorithms" published in Image Processing on Line on Dec. 17, 2013, vol. 3, pp. 286-310, 25 pages.

He, K. et al."Guided Image Filtering" IEEE Transactions on Pattern Analysis and Machine Intelligence, vol. 35, No. 6, Jun. 2013, pp. 1397-1409, 13 pages.

ITU Rec. ITU-R BT. 1886, "Reference electro-optical transfer function for flat panel displays used in HDTV studio production," (Mar. 2011), 7 pages.

SMPTE ST 2084:2014 "High Dynamic Range Electro-Optical Transfer Function of Mastering Reference Displays"; 14 pages.

Wells, William M. "Efficient synthesis of Gaussian filters by cascaded uniform filters." IEEE Transactions on Pattern Analysis and Machine Intelligence 2 (1986): 234-239. 6 pages.

* cited by examiner

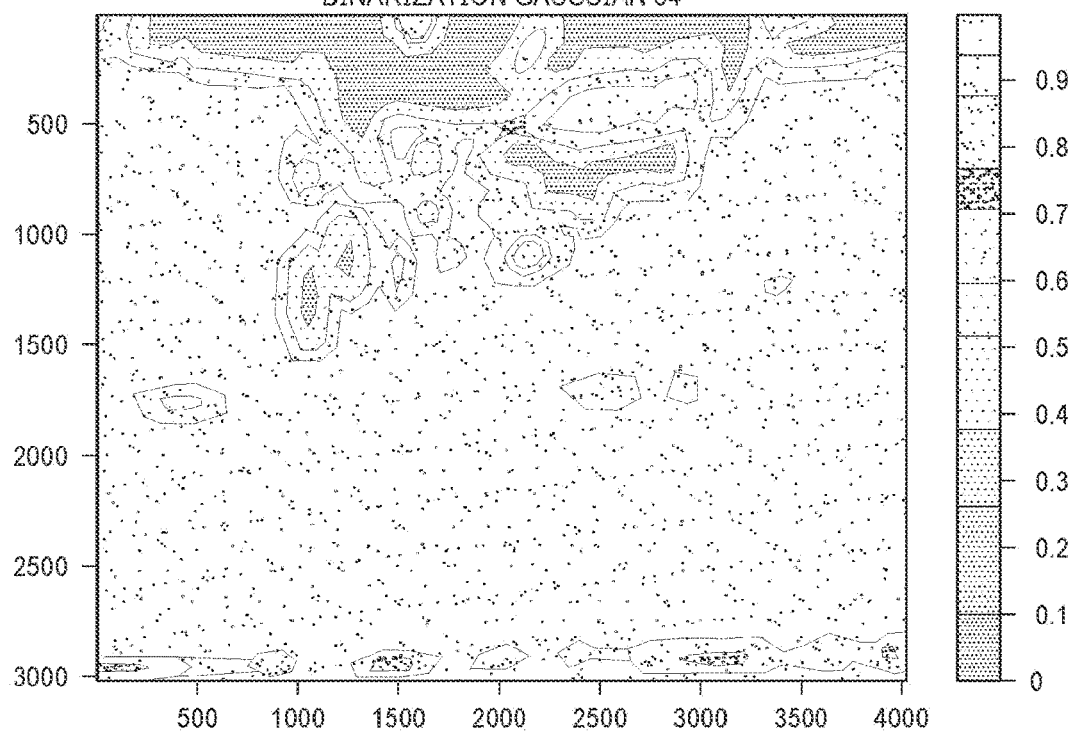
FIG. 3E
FIG. 3F
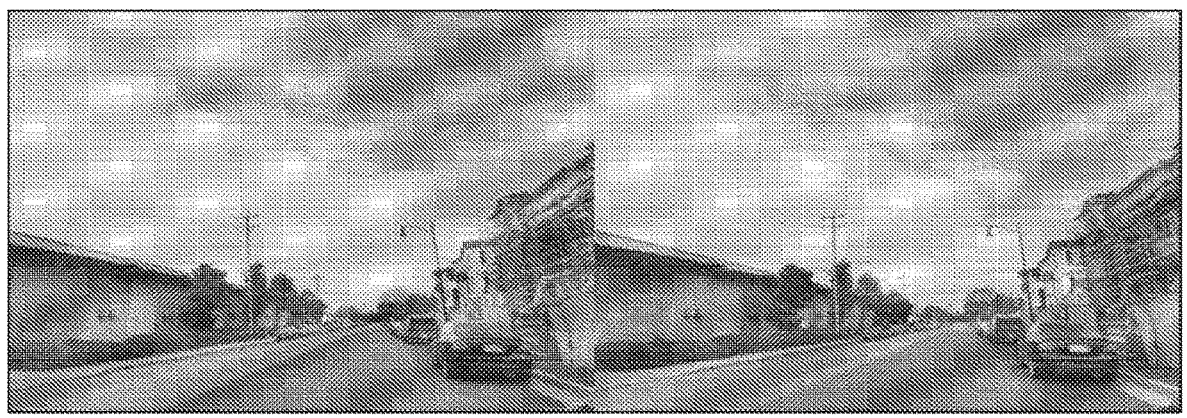

GENERATING HDR IMAGE FROM CORRESPONDING CAMERA RAW AND SDR IMAGES

CROSS-REFERENCE TO RELATED APPLICATIONS

This application is a U.S. 371 National Phase Application of PCT/US2023/063937 filed 8 Mar. 2023, which claims the benefit of priority from U.S. Provisional Application No. 63/333,374 and European Application No. 22169192.6, both filed on 21 Apr. 2022, each one incorporated by reference in its entirety.

TECHNOLOGY

The present disclosure relates generally to image processing operations. More particularly, an embodiment of the present disclosure relates to video codecs.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. While perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 cd/m$^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). An example of such an EOTF is defined in SMPTE 2084 and Rec. ITU-R BT.2100, "Image parameter values for high dynamic range television for use in production and international programme exchange," (June 2017). As appreciated by the inventors here, improved techniques for generating high quality video content data with high dynamic range, high local contrast and vivid color are desired.

WO 2022/072884 A1 discloses an adaptive local reshaping method for SDR-to-HDR up-conversion. A global index value is generated for selecting a global reshaping function for an input image of a relatively low dynamic range using luma codewords in the input image. Image filtering is applied to the input image to generate a filtered image. The filtered values of the filtered image provide a measure of local brightness levels in the input image. Local index values are generated for selecting specific local reshaping functions for the input image using the global index value and the filtered values of the filtered image. A reshaped image of a relatively high dynamic range is generated by reshaping the input image with the specific local reshaping functions selected using the local index values.

CN 112 200 719 A discloses an image processing method comprising the steps of acquiring a first resolution standard dynamic range SDR image; according to the first resolution SDR image, obtaining a guide map of a second resolution SDR image and a filter coefficient of the second resolution SDR image; and performing guided filtering processing according to the guide map of the second-resolution SDR image and the filtering coefficient of the second-resolution SDR image to obtain a second-resolution HDR image, wherein a second resolution is higher than a first resolution.

According to the disclosure, the calculation complexity of the filter coefficient can be reduced, rapid mapping from the SDR image to the HDR image is realized, and the problem of large calculation amount of a mapping method from the SDR image to the HDR image is solved.

WO 2020/210472 A1 discloses a method for generating a high-dynamic-range (HDR) image. The method includes (a) denoising a short-exposure-time image, wherein the denoising comprises applying a first guided filter to the short-exposure-time image, the guided filter utilizing a long exposure-time-image as its guide, (b) after the step of denoising, scaling at least one of the short-exposure-time image and the long-exposure-time image to place the short-exposure-time image and the long-exposure-time image on a common radiance scale, and (c) after the step of scaling, merging the short-exposure-time image with the long-exposure-time image to generate the HDR image.

US 2015/078661 A1 discloses algorithms for improving the performance of conventional tone mapping operators (TMO) by calculating both a contrast waste score and a contrast loss score for a first tone-mapped image produced by the TMO. The two contrast scores can be used to optimize the performance of the TMO by reducing noise and improving contrast. Algorithms for generating an HDR image by converting non-linear color space images into linear color space format, aligning the images to a reference, de-ghosting the aligned images if necessary, and merging the aligned (and potentially de-ghosted) images to create an HDR image. The merging can be performed with exposure fusion, HDR reconstruction, or other suitable techniques.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY OF THE INVENTION

The invention is defined by the independent claims. The dependent claims concern optional features of some embodiments of the invention.

BRIEF DESCRIPTION OF THE DRAWINGS

An embodiment of the present invention is illustrated by way of example, and not by way of limitation, in the figures of the accompanying drawings and in which like reference numerals refer to similar elements and in which:

FIG. 3E illustrates an example two-dimensional map with smoothened binarized local standard deviations; FIG. 3F illustrates example compressed and fused SDR images.

DESCRIPTION OF EXAMPLE EMBODIMENTS

Figure 1:
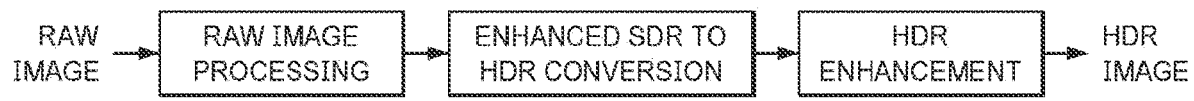
FIG. 1 illustrates example conversion from a camera raw image and an SDR image to a corresponding HDR image.

In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily occluding, obscuring, or obfuscating the present disclosure.

SUMMARY

An image acquisition device may be used to capture a camera raw image. The camera raw image stores original (physical or optical) sensor information (or sensor readout) that has not yet been processed by a camera image signal processor (ISP). Image signal processing operations may be performed on the camera raw image with the camera ISP of the image acquisition device to generate a (JPEG) SDR image-such as a thumbnail image with relatively small spatial resolution and relatively low dynamic range-corresponding to the camera raw image. The camera raw image and the SDR image may be included or digitally packaged in a single (raw) image container or file. Examples of such image container may include, but are not necessarily limited to only, any of: DNG (Digital Negative) files, TIFF files, BMP files, JPEG files, etc.

Under techniques as described herein, the camera raw image and the SDR image may be converted into a corresponding HDR image of relatively high quality with a visually pleasing look comparable with or better than a device-generated HDR image. These techniques may be implemented by the image acquisition device itself or a separate computing device as a part of an out-of-ISP image processing tool. A non-limiting example of such out-of-ISP image processing tool may be, but is not necessarily limited to only, Adobe Photoshop, which can be operated by a user to make use of the camera raw image as a starting point to create their own preferred image(s).

In many operational scenarios, while possessing a relatively pleasing picture look, the JPEG SDR image is generated with a relatively low spatial resolution and/or a relatively low bit depth as compared with the camera raw image by performing numerous local mapping/processing operations on different spatial regions or image blocks on the camera raw image using the (e.g., dedicated, etc.) camera ISP of the image acquisition device.

In contrast, while not necessarily looking visually pleasing, the camera raw image does contain relatively rich image data-such as image details of the highest resolution image supported by image sensors used to generate the camera raw image.

Under techniques as described herein, a relatively high quality (or visual pleasing) HDR image can be generated from the SDR image with numerous details from the camera raw image by leveraging both the SDR image and the camera raw image. As compared with the SDR image, the camera raw image can be used to help create an HDR image with better image details. In the meantime, given that the SDR image possesses the relatively pleasing picture look (or SDR picture mode) supported by the image acquisition device or camera, the SDR image can be used along with the camera raw image to help provide or present the best visual look in the resultant HDR image.

In some operational scenarios, a framework implementing these techniques can include multiple (e.g., three, etc.) stages or main components. The first stage uses local linear mapping and/or guided filtering with different (spatial filtering) kernel sizes to generate filtered SDR images from the camera raw and the (e.g., JPEG, etc.) SDR image and to generate an enhanced SDR image through fusing the filtered SDR images. The second stage converts the enhanced SDR image to an HDR image using a static SDR-to-HDR mapping. The static mapping may be defined or specified with operational parameters learned or optimized in a training process using training RAW/SDR/HDR images. The training images used to train the optimized operational parameters for the static SDR-to-HDR mapping can include but not limited to spatially aligned SDR and HDR images generated from captured SDR and HDR images or pictures. The third stage applies local reshaping or hybrid shifted sigmoid function(s) for image enhancement to further enrich contrasts, image details, color saturations, etc., in the HDR image generated in the second stage. It should be noted that local linear mapping tools used in the first stage as well as image enhancement tools used in the third stage may be applied to different image processing applications or operational scenarios, not necessarily limited to converting RAW/SDR images to corresponding HDR images as described herein. For example, some or all of these local linear mapping and/or image enhancement tools can be used individually or in combination to provide a relatively rich set of operational parameters for users to choose and customize converted HDR images into different preferred visual looks.

In some operational scenarios, the training camera raw/SDR/HDR images can be obtained or captured with a mobile device. One or more such mobile devices can be operated to shoot or capture both (training) camera raw and SDR images and (training) HDR images such as in captured Profile 8.4 videos. The collected/captured training camera raw/SDR images and the collected/captured training HDR images can be used to establish or specify training mappings or pairs each of which comprises a training camera raw image, a training SDR image corresponding to the training camera raw image, and a training HDR image corresponding to the training camera raw image and the training SDR image. These training images can then be used to optimize operational parameters in image processing or enhancement tools as described herein to generate the optimized operational parameters.

The multi-stage framework as described herein can be deployed or adapted to different image acquisition devices or cameras with similar training processes. Once these image processing tools including prediction/mapping models or optimized operational parameters for the stages of the framework are generated or trained by training process(es) as described herein, these image processing tools or modules can be deployed, installed, downloaded, and/or executed at a mobile device side or at a cloud-based server side.

Example embodiments described herein relate to generating images of a first dynamic range from input images of a second dynamic range different from the first dynamic range. Guided filtering is applied, with a camera raw image as a guidance image, to a first image to generate an intermediate image. The first image of the first dynamic range has been generated from the camera raw image with an image signal processor of an image acquisition device. A dynamic range mapping is performed on the intermediate image of the first dynamic range to generate a second image of a second dynamic range different from the first dynamic range. The second image of the second dynamic range is used to generate specific local reshaping function index values for selecting specific local reshaping functions for the second image of the second dynamic range. The specific local reshaping functions are applied to the second image of the second dynamic range to generate a locally reshaped image of the second dynamic range.

Example Video Delivery Processing Pipeline

FIG. 1 illustrates an example conversion framework for converting a camera raw image (along with an SDR image) into a corresponding HDR image. By way of illustration but not limitation, the conversion framework includes three main components or processing blocks. Some or all of the conversion framework or components/processing blocks therein may be implemented in software, hardware, a combination of software and hardware, etc.

The first main component or processing block of the conversion framework is to receive the camera raw image and the SDR image and process the received images to generate an intermediate image. The received SDR image may be generated by a camera ISP of an image acquisition device, while a camera of the image acquisition device contemporaneously captures or acquires the camera raw image. The received SDR image can serve as a thumbnail image or a relatively low resolution low dynamic range image representative of the relatively high resolution relatively high dynamic range camera raw image. Example intermediate image may, but is not necessarily limited to only, an enhanced SDR image.

In some operational scenarios, the camera raw image and the SDR image may be digitally packed or packaged together in an input image container or file received as input by the first main component or process block. Such image container or file may contain a relatively rich set of image data including but not limited to the camera raw image in the form of an original raw sensor image, the SDR image in the form of a JPEG SDR thumbnail image, etc. The camera raw image represents captured light rays by light sensors, whereas the SDR image represents a processed (e.g., SDR, thumbnail, preview, etc.) image look generated by the camera ISP performing a relatively large number of global/local image processing on the camera raw image. Techniques as described herein can take advantage of both the camera raw and SDR images to generate the intermediate image such as the enhanced SDR image for the next main component or processing block (or stage) to use or perform further image processing operations.

The second main component or processing block is to receive the enhanced image generated by the first main component or processing block as input and convert it into an HDR image using one of dynamic and/or static (image conversion/mapping) models of various types. By way of illustration but not example, a static model may be implemented as a static three-dimensional lookup table (3D-LUT) and built from tensor product B-spline (TPB)-based mappings/functions/models in an RGB domain with a relatively low computation complexity or cost. Additionally, optionally or alternatively, a 3D-LUT as described herein may be built from a three-dimensional mapping table (3DMT). The 3D-LUT built with 3DMT might incur more irregularity and discontinuity and hence might be more likely to cause banding or color artifact. In comparison, a 3D-LUT built with a TPB-based model may have less irregularity and more smoothened continuity in local neighborhood of a codeword space or in nearby codeword nodes or entries of the 3D-LUT and hence provide more perceptually pleasing looks. Example TPB-based mappings/functions/models can be found in U.S. Provisional Patent Application Ser. No. 62/908,770, "Tensor-product B-spline predictor," by Guan-Ming Su, Harshad Kadu, Qing Song and Neeraj J. Gadgil, filed on Oct. 1, 2019, the contents of which are entirely incorporated herein by reference as if fully set forth herein. Example operations to build lookup tables such as 3D-LUTs from 3DMT for SDR-to-HDR mapping or conversion can be found in U.S. patent application Ser. No. 17/054,495, filed on May 9, 2019, the contents of which are entirely incorporated herein by reference as if fully set forth herein.

The third main component or processing block in the framework is to receive the (mapped or converted) HDR image generated by the second main component or processing block as input and enhance or improve local contrasts, local image details and local saturations in the mapped HDR image to generate an output HDR image. Similar to SDR images outputted from the camera ISP, HDR images outputted from the camera ISP are also enhanced with visually pleasing looks by local image processing tools used by or with the camera ISP. The framework as described herein, or the third main component or processing block therein, can be used to support or provide same or similar levels of visually pleasing looks as compared with those of native HDR images outputted by the camera ISP output HDR images. In some operational scenarios, the framework can be used to provide an HDR image enhancement component—e.g., outside or in place of the camera ISP or local image processing tools operating in conjunction with the camera ISP, etc.—that enhances the (mapped or converted) HDR image to make it look perceptually or visually appealing.

Raw Image Processing

Figure 2B:
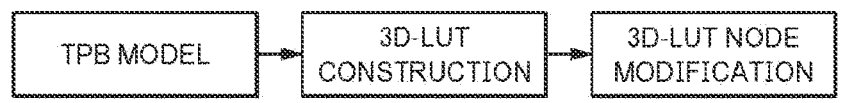
FIG. 2B illustrates example construction of a static three-dimensional lookup table (3D-LUT)
Figure 2A:
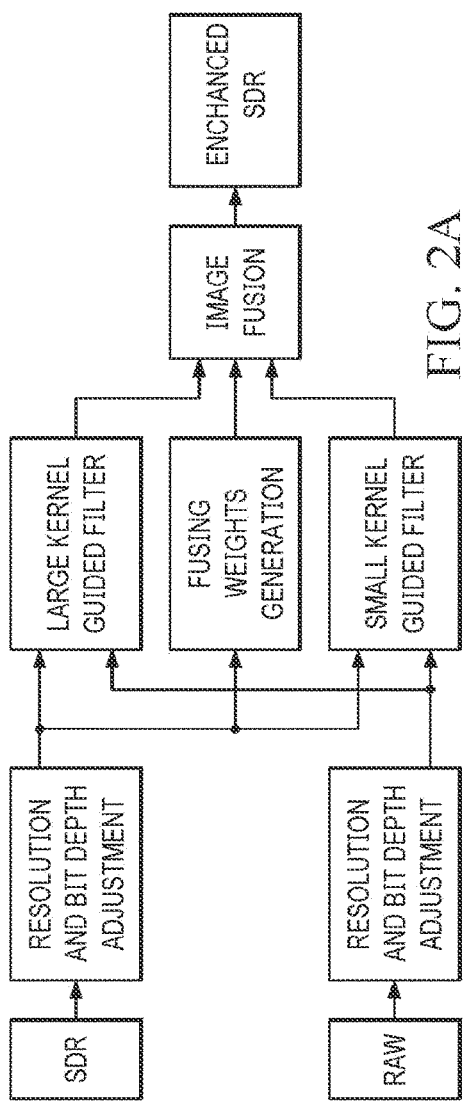
FIG. 2A illustrates example generation of an enhanced SDR image as an intermediate image.

FIG. 2A illustrates an example first main component or processing block ("Raw Image Processing") of FIG. 1 for generating an enhanced SDR image as an intermediate image. As shown in FIG. 2A, resolution and bit depth adjustment may be respectively performed on a (JPEG) SDR image and a camera raw image corresponding or giving rise to the (JPEG) SDR image. A first guided filter with a relatively small spatial kernel may be performed on the adjusted SDR image with enhancement information extracted from the adjusted camera raw image to generate a first filtered SDR image. A second guided filter with a relatively large spatial kernel may also be performed on the adjusted SDR image with enhancement information extracted from the adjusted camera raw image to generate a second filtered SDR image. Local standard deviations may be determined in the adjusted (JPEG) SDR image and used to derive fusing weighting factors. Image fusion may be performed on the first and second filtered SDR images based on the (fusing) weighting factors to generate an enhancement SDR image.

As noted, a raw image or an image container/file storing a camera raw image may also include a camera ISP generated image such as an SDR image. In many operational scenarios, the (e.g., JPEG, etc.) SDR image, which is generated by the camera ISP from the camera raw image, already provides relatively high visual quality (looks) as the camera ISP has performed numerous image processing operations, such as local tone mapping, noise reduction, detail enhancement, color enrichment, etc. To generate a visual pleasing HDR image corresponding to or from image data stored in the raw image or the image container/file, the (JPEG) SDR image can be used as a (e.g., good, etc.) starting point. The (JPEG) SDR might discard some details during the (camera) ISP processing or suffer compression artifact. Under an image fusion framework implemented by techniques as described herein, some or all missing detailed information in the SDR image as a result of ISP processing or compression can be acquired or re-acquired from sensor raw data stored in the camera raw image, which may have a higher spatial resolution and contain all image data, information and/or details before all image processing operations used to derive the (JPEG or compressed) SDR image. Under this image fusion framework, image data, information and/or details extracted from the camera raw image can be used as extra information to be merged or fused together with image data, information and/or details represented or contained in the (JPEG) SDR image to generate an intermediate image. The intermediate image may be an enhanced SDR image as compared with the (JPEG) SDR image and used to generate a relatively high quality HDR image by applying an SDR-to-HDR conversion to the enhanced SDR image in place of the (JPEG) SDR image.

The camera raw (or sensor) image and the (JPEG) SDR image may have different spatial resolutions with the camera raw image often having a higher spatial resolution than the (JPEG) SDR image. The camera raw (or sensor) image and the (JPEG) SDR image may have different bit depths. To combine or fuse image data or information in both the camera raw and SDR images, the SDR image can be upsampled to the same resolution as that of the camera raw image. Where applicable, one or both of the camera raw and SDR images can be converted a common bit depth such as 16 bits—or each codeword or codeword component in the images may be represented as a 16-bit value. With these adjustment operations, the spatial resolutions and bit depths of the (adjusted) camera raw and SDR images are aligned.

Denote the i-th pixel of the (adjusted) camera raw (or sensor) image as Ti and of the corresponding (adjusted) JPEG SDR image as $s_i$.

Several image enhancement tasks can be performed to generate the enhanced SDR image as the intermediate image. First, some or all missing or lost information in the (JPEG) SDR image—resulted from or owning to a relatively small spatial resolution, quantization distortions associated with a relatively low bit depth (e.g., 8-bit JPEG, etc.), image compression artifact from lossy compression in generating the JPEG SDR—may be recovered. Second, some or all clipped information (or clipped codeword values) in the (JPEG) SDR image caused by the camera ISP performing tone mapping to fit in a (designated) SDR dynamic range may also be recovered.

Artifacts can be resulted from spatial resolution re-sampling operations, especially near edges (e.g., contours of a human figure, contours of eyes, etc.) separating different image details. As the previously down-sampled JPEG-SDR image (e.g., as a part of the camera ISP processing, etc.) is up-sampled back to a higher spatial resolution up to that of the camera raw image, these edges separating the image details can be blurred and may show visual distortions such as zigzag "pixelation" like artifacts. As a part of the image enhancement tasks, these (edge) artifacts can be treated as noises in the SDR image. Original or relatively accurate edge information in the camera raw image can be extracted and used with edge preserving filtering to enhance the SDR image including the distorted edges therein.

In some operational scenarios, a guided filter may be used as an edge preserving filter to perform edge preserving filtering relatively efficiently. As the edges are visually shown or depicted in relatively small image details or relatively small spatial scales/regions, the guided filter may be set or configured with a relatively small kernel size.

Artifacts can also be resulted from tone mapping which the camera ISP uses to map the camera raw image to the SDR image, especially in highlights and dark regions caused by (codeword value range) clippings. This can occur when the camera ISP adjusts an input (e.g., relatively high, etc.) dynamic range in all codewords or pixel values of an entire captured scene to an output (e.g., relatively low, etc.) dynamic range such as SDR. The camera ISP may perform tradeoffs to keep or maintain more codewords in mid-tone regions of the captured scene at the expense of using fewer codewords or clipping in the highlights or dark regions of the captured scene.

Assume that local tone mapping that maps a local area (e.g., a specific image details, a specific image coding unit, a specific image block, etc.) of the camera raw image to a corresponding local area of the (JPEG) SDR image is linear. Local image data or information in the corresponding local areas of the camera raw image and the (JPEG) SDR image can be collected to construct or reconstruct a linear model for the local tone mapping. This "local" mapping can be done with a sliding window moving through each local neighborhood in a plurality of local neighborhoods constituting some or all of the (JPEG) SDR image. A second guided filter may be used to help construct the local mapping. As highlights or dark regions over which this local tone mapping seeks to recover missing clipped codeword or pixel values are relatively large as compared with edges delineating or separating different image details, a relatively large kernel size can be used with the second guided filter.

For a guided filter, it is assumed that there exists a linear correlation locally (e.g., in a local neighborhood, etc.) between the (adjusted JPEG) SDR image as an input image (in which the i-th pixel may be denoted as $s_i$ as previously mentioned) and the adjusted camera raw image as a guidance image (in which the i-th pixel may be denoted as $r_i$ as previously mentioned). Given a local neighborhood (denoted as $\phi_i$) of size B×B (or B pixel rows times B pixel columns) centering at the i-th pixel in each of the input image and the guidance image, the local linear correlation in the neighborhood may be modeled or represented with a linear function ($\alpha_i$, $\beta_i$) of the input and guidance image, as follows:

$$\hat{s}_i = \alpha_i \cdot r_i + \beta_i \quad (1)$$

The difference between the input image ($s_i$) and a predicted image (in which the i-th pixel is denoted as $\hat{s}_i$) can be modeled or represented as noise or a noise image (in which the i-th pixel is denoted as $n_i$), as follows:

$$\hat{s}_i = s_i + n_i \quad (2)$$

The linear function used to model the local linear correlation, or operational parameters such as slope $\alpha_i$ and offset $\beta_i$ therein, can be determined or found by minimizing the difference between $s_i$ and $\hat{s}_i$, as follows:

$$(\alpha_i^{opt}, \beta_i^{opt}) = \underset{(\alpha_i, \beta_i)}{\operatorname{argmin}} \sum\nolimits_{k \in \phi_i} \left( \|\hat{s}_k - s_k\|^2 + \in (\alpha_i)^2 \right)$$

$$= \underset{(\alpha_i, \beta_i)}{\operatorname{argmin}} \sum\nolimits_{k \in \phi_i} \left( \|\alpha_i \cdot r_k + \beta_i - s_k\|^2 + \in (\alpha_i)^2 \right) \quad (3)$$

where $\in (\alpha_i)^2$ represents a regularization term of a relatively small value to ensure convergence to an optimization/minimization solution.

An optimized solution ($\alpha_i^{opt}$, $\beta_i^{opt}$) can be obtained or computed as follows:

$$\alpha_i^{opt} = \frac{\frac{1}{B^2} \sum\nolimits_{k \in \phi_i} (r_k \cdot s_k) - \mu_i \cdot \bar{s}_i}{(\sigma_i)^2 + \in} \quad (4\text{-}1)$$

$$\beta_i^{opt} = \bar{s}_i - \alpha_i^{opt} \cdot \mu_i \quad (4\text{-}2)$$

$$\bar{s}_i = \frac{1}{B^2} \sum\nolimits_{k \in \phi_i} (s_k) \quad (4\text{-}3)$$

where $\mu_i$ and $(\sigma_i)^2$ represents the mean and variance of $r_i$ in $\phi_i$.

To avoid sudden changes or discontinuities, the linear function used to model the local correlation in the local neighborhood between the input and guidance images may make use of the averages (denoted as $\bar{\alpha}_i$ and $\bar{\beta}_i$) of optimized operational parameters computed for some or all pixels in the local neighborhood of the i-th pixel to ensure smoothness between or among adjacent pixels, as follows:

$$\bar{\alpha}_i = K \frac{1}{B^2} \sum\nolimits_{k \in \phi_i} (\alpha_k) \quad (5\text{-}1)$$

$$\bar{\beta}_i = \frac{1}{B^2} \sum\nolimits_{k \in \phi_i} (\beta_k) \quad (5\text{-}2)$$

where k denotes pixels in the neighborhood $\phi_i$ of the i-th pixel.

The final (guided filtered or predicted) value of the i-th pixel may be given as follows:

$$\hat{s}_i = \bar{\alpha}_i \cdot r_i + \bar{\beta}_i \quad (6)$$

The foregoing guided filter operations as illustrated in expressions (1) through (6) above may be denoted as follows:

$$s_i = \text{GUIDE}(\{s_i\}, \{r_i\}, B) \quad (7)$$

Spatial Detail Enhancement from Resampling

To reconstruct image or spatial details including but not limited to those relating edges lost through resampling (or downsampling and/or upsampling), the guided filter in expression (7) above may be deployed or applied with a relatively small neighborhood with a relatively small value of B. The relatively small value of B used to recover image or spatial details lost to resampling may be denoted as Bs. An example value for Bs may be, but is not necessarily limited to only, any of 12, 15, 18, etc.

The deployment or application of the guided filter with this relatively small value Bs may be represented as follows:

$$\hat{s}_i^S = \bar{\alpha}_i^S \cdot r_i + \bar{\beta}_i^S \quad (8)$$

Figure 3A:
FIG. 3A illustrates example compressed and filtered SDR images in guided filtering with a relatively small kernel.

FIG. 3A illustrates an example (JPEG) SDR image—on the left—and an example filtered SDR image-on the right— with a guided filter of a relatively small neighborhood (or spatial kernel) incorporating enhancement information from a camera raw image corresponding or giving rise to the (JPEG) SDR image. As shown, a great amount of details have been recovered by way of the enhancement information from the camera raw image via the guided filter with the relatively small neighborhood (or spatial kernel).

Figure 3B:
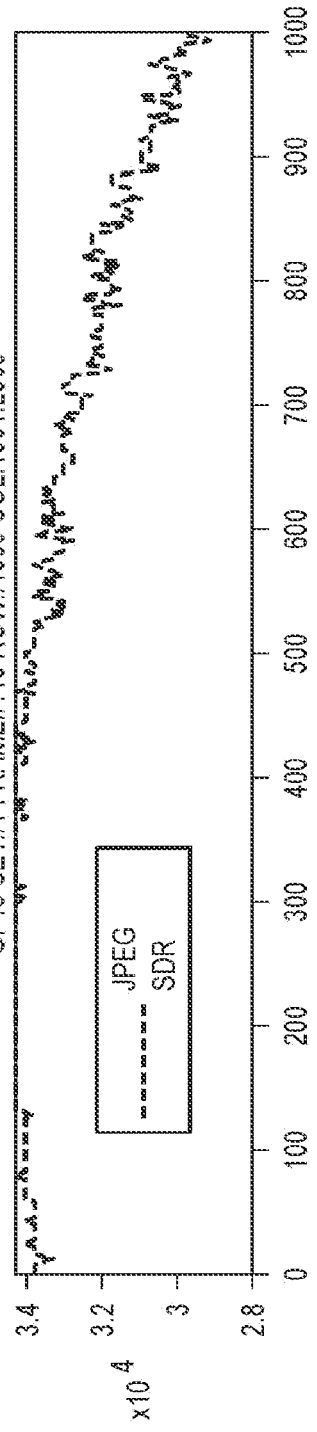
FIG. 3B and FIG. 3C illustrate example codeword plots of JPEG SDR, filtered SDR and/or camera raw images.
Figure 3B:
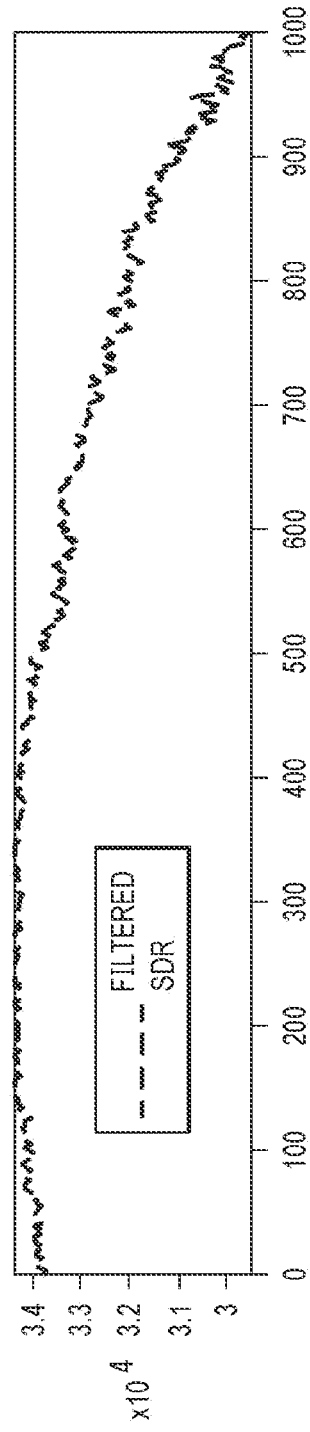
Figure 3B:
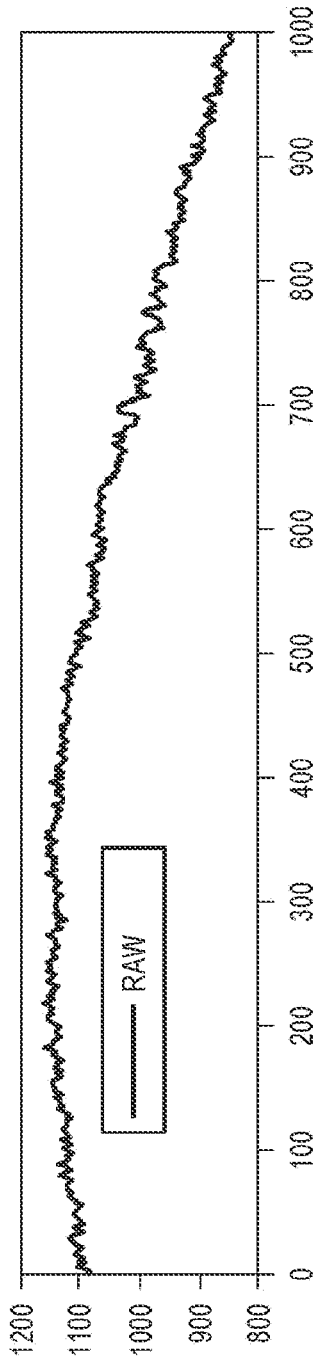
Figure 3C:
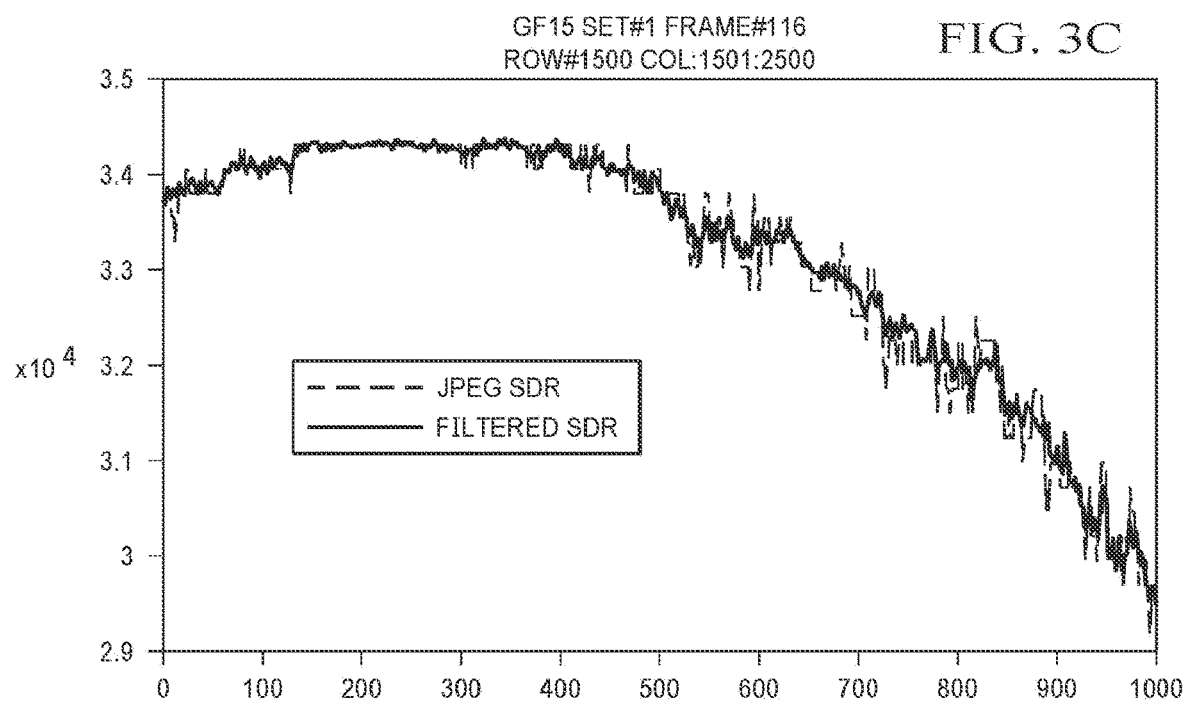

FIG. 3B illustrates three example plots of codeword values in corresponding rows of the (JPEG) SDR image, the filtered SDR image and the camera raw image. More specifically, the first plot depicts compressed codeword values of a row of the (JPEG) SDR image, the second plot depicts filtered codeword values of a row (corresponding to the row of the (JPEG) SDR image) of the filtered SDR image, and the third plot depicts camera raw codeword values of a row (corresponding to the row of the (JPEG) SDR image) of the camera raw image. The first and second plots are overlaid in FIG. 3C for ease of comparison. As shown, in comparison with the compressed codeword values of the (JPEG) SDR image row, the guided filter increases the total number of codeword values in the filtered codeword values of the filtered SDR image row, thereby causing the filtered SDR image to contain more image details represented in the camera raw image. Hence, the guided filter effectively increases the bit depth for the filter SDR image and significantly alleviates banding artifacts that could otherwise be caused by the relatively small total number of compressed codewords used in the (JPEG) SDR image.

Spatial Detail Enhancement from Clipping

As noted, assuming that a mapping implemented with the camera ISP to covert the camera raw image to the (JPEG) SDR mapping is locally linear, a (second) guided filter can be deployed or applied for recovering spatial details lost to (codeword) clipping, for example in highlights or dark regions. Spatial regions affected by the clipping in the (JPEG) SDR image typically occur in or over a large spatial area. As pixels within the spatial regions have a constant value (e.g., an upper or lower limit of a codeword space comprising available codewords for coding, etc.), a small kernel size may not be able to recover the lost details due to clipping and may instead result in a linear function trained to map different non-constant (codeword or pixel) values to a constant (codeword or pixel) value. Such linear function would be ineffective to recover the lost details due to clipping. Hence, a relatively large neighborhood or kernel size may be used with the (second) guided filter to cover relatively large areas that include both non-clipped pixels and clipped pixels. Correspondingly, a relatively large value denoted as BL may be selected for the parameter B in expression (7) above. An example value of BL may, but is not necessarily limited to only, any of: 512, 1024, 2048, etc.

The deployment or application of the guided filter with this relatively large value BL may be represented as follows:

$$\hat{s}_i^L = \bar{\alpha}_i^L \cdot r_i + \bar{\beta}_i^L \quad (9)$$

Figure 3D:
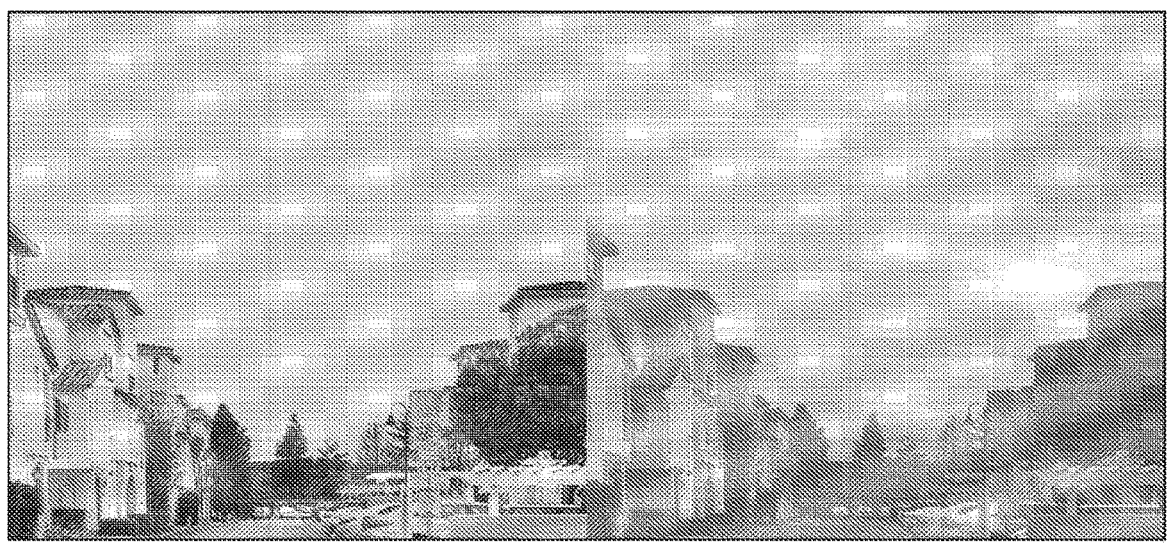
FIG. 3D illustrates example compressed and filtered SDR images in guided filtering with a relatively large kernel.

FIG. 3D illustrates an example (JPEG) SDR image—on the left—and an example filtered SDR image—on the right—with a guided filter of a relatively large neighborhood (or spatial kernel) incorporating enhancement information from a camera raw image corresponding or giving rise to the (JPEG) SDR image. As shown, visually noticeable spatial details such as clouds depicted in the image that were lost to clipping in the (JPEG) SDR image have been recovered in the filtered SDR image by way of the enhancement information from the camera raw image via the (second) guided filter, though some colors and details depicted in the (JPEG) SDR image are altered in non-clipped spatial regions or areas such as buildings and trees in the filtered SDR image.

In some operational scenarios, the relatively large kernel size used in guided filtering may set to be equal to or even larger than the entire picture/frame. This is equivalent to have a global mapping from the camera raw image to the (JPEG) SDR image. While this model can be implemented with relatively high computing efficiency and relatively low computation complexity, the resultant filtered SDR image may not contain as much clipped spatial and/or color details in the previously clipped spatial regions/areas as compared with a filtered SDR image generated with a relatively large kernel size but smaller than the entire picture/frame. In this case, we can have a simple and very fast global linear regression model.

Image Fusion from Multiple Enhanced or Filtered Images

Though guided filters can be used to reconstruct lost details, filtered images generated from guided filters or filtering with different kernel sizes have different pros and cons. For example, a guided filter with a relatively small kernel size may not recover spatial or color details from clipping, whereas a guided filter with a relatively large kernel size may affect color or brightness and even blur image details in non-clipped spatial regions/areas.

To take advantage of both small and large kernel sizes, image fusion may be used to combine different filtered images together into an overall filtered image. As a guided filter with a relatively large kernel size is to increase or recover spatial and/or color details missing in clipped areas of the JPEG SDR image, the guided filter can be limited to apply to the clipped spatial regions/areas. In some operational scenarios, clipped spatial regions/areas are detected in the (JPEG) SDR image. A weighting factor map used to effectuate the image fusion may be generated to limit or prevent adverse impact from the second guided filter in the non-clipped spatial regions/areas.

Figure 4A:
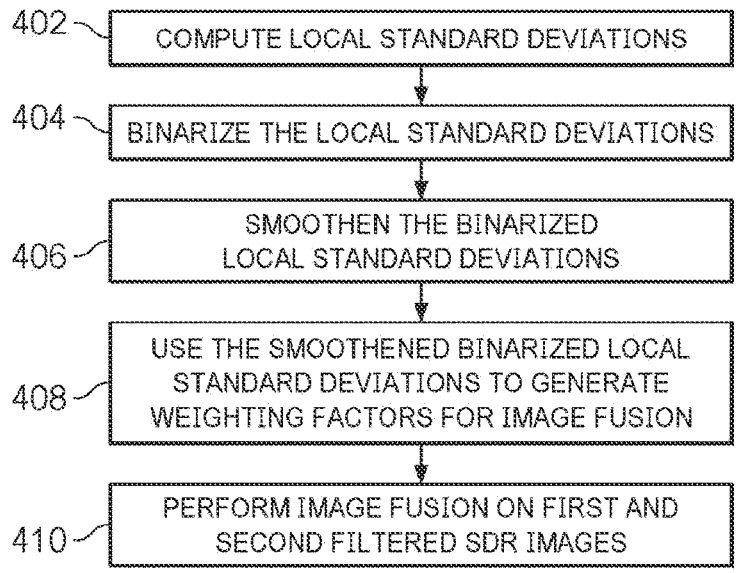
FIG. 4A and FIG. 4B illustrate example process flows.

FIG. 4A illustrates an example process flow for generating a weighting factor map for a combination of a first guided filter with a relatively small kernel size and a second guided filter with a relatively large kernel size. This process flow can be run repetitively to generate a specific weighting factor map for each color channel of a color space in which the JPEG SDR image and/or the filtered images are represented.

Block 402 comprises computing local standard deviations. For each (e.g., the i-th, etc.) SDR pixel in the (JPEG) SDR image, a local standard deviation denoted as di can be computed with a standard deviation filter with a filter kernel set to a $B_d \times B_d$ pixel neighborhood $\psi_i$ centering at or around the i-th SDR pixel, as follows:

$$d_i = \frac{1}{|\psi_i|} \sum_{k \in \psi_i} \left( s_k - \frac{\sum_{k \in \psi_i} s_k}{|\psi_i|} \right)^2 \quad (10)$$

A non-limiting example value of $B_d$ may be, but is not necessarily limited to only, 9. The local standard deviations may be represented as a two-dimensional local standard deviation map each pixel in which has a pixel value as a local standard deviation computed for the pixel.

Block 404 comprises binarizing the local standard deviations as outputted from the standard deviation filter. A binarization threshold denoted as $T_d$ may be selected or used to binarize the local standard deviation map or the local standard deviations therein into a binary mask, as follows:

$$\hat{d}_i = \begin{cases} 1 & \text{if } d_i > T_d \\ 0 & \text{else} \end{cases} \quad (11)$$

A non-limiting example value of the threshold $T_d$ may be, but is not necessarily limited to only, 0.01.

Block 406 comprises applying a Gaussian spatial filter to construct smooth spatial transitions in a spatial distribution of binary values 0 and 1 in the binary mask to generate spatially smoothly transitioned binarized local standard deviations denoted as di. The Gaussian spatial filter may be given as follows:

$$d_i = \frac{1}{\sqrt{2\pi}\,\sigma_G} e^{-\frac{(\hat{d}_i)^2}{2(\sigma_G)^2}} \quad (12)$$

where $\sigma_G$ represents a standard deviation. Example values for $\sigma_G$ may include, but are not necessarily limited to only, one of 32, 64, 128, etc.

The spatially smoothly transitioned binarized local standard deviations may be represented as a two-dimensional map, as illustrated in FIG. 3E, each pixel in which has a pixel value as a spatially smoothly transitioned binarized local standard deviation for the pixel.

Block 408 comprises generating and normalizing or renormalizing weighting factors used to combine filtered images generated from guided filters with relatively small and large spatial kernel sizes.

Maximum and minimum values (denoted $\tilde{d}^{max}$ and $\tilde{d}^{min}$ respectively) may be determined or found among all of the spatially smoothly transitioned binarized local standard deviations di. The maximum and minimum values $\tilde{d}^{max}$ and $\tilde{d}^{min}$ may be used to normalize the spatially smoothly transitioned binarized local standard deviations $\tilde{d}$, for example into a normalized value range [0 1].

First weighting factors denoted as was to be applied to filtered pixel or codeword values of a first filtered SDR image generated from a first guided filter with a relatively small spatial kernel may be set to the normalized spatially smoothly transitioned binarized local standard deviations, as follows:

$$w_i^S = \frac{\tilde{d}_i - \tilde{d}^{min}}{\tilde{d}^{max} - \tilde{d}^{min}} \quad (13)$$

Second weighting factors denoted as w/to be applied to filtered pixel or codeword values of a second filtered SDR image generated from a second guided filter with a relatively large spatial kernel may be set to complement values of the first weighting factors, as follows:

$$w_i^L = 1 - w_i^S \quad (14)$$

Block 410 comprising performing image fusion on the first filtered SDR image $\hat{s}_i^S$ and the second filtered SDR image $\hat{s}_i^L$ using both the first and second weighting factors $w_i^S$ and $w_i^L$, as follows:

$$\hat{s}_i = w_i^S \cdot \hat{s}_i^S + w_i^L \cdot \hat{s}_i^L \quad (15)$$

FIG. 3F illustrates an example (JPEG) SDR image with clipped and resampled codeword or pixel values on the left and an example enhanced or fused SDR image generated from fusing guided filtered SDR images generated with guided filtering using relatively small and large spatial kernels. This enhanced or fused (guided filtered) SDR image may be used as an intermediate image and provided to the second main component or processing block ("Enhanced SDR to HDR Conversion") of FIG. 1 as a part of input for constructing an HDR image corresponding to the (JPEG) SDR image and/or the camera raw image.

Enhanced SDR to HDR Conversion

The second main component or processing block ("Enhanced SDR to HDR Conversion") of FIG. 1 receives an enhanced SDR image from the first main component or processing block ("Raw Image Processing") of FIG. 1 and converts or maps (each SDR pixel or codeword value of) the enhanced SDR image into (a respective HDR pixel or codeword value of) an HDR image corresponding to a (JPEG) SDR image and a camera raw image used to generate the enhanced SDR image. In some operational scenarios, the SDR-to-HDR conversion or mapping can be performed via a static 3D-LUT, which for example may map an R.709 RGB SDR pixel or codeword value as input to an R.2020 RGB HDR pixel or codeword value as output.

FIG. 2B illustrates example construction of a static 3D-LUT as described herein. By way of illustration, the construction of the 3D-LUT may include three stages such as building a TPB SDR-to-HDR conversion/mapping model, using the TPB model to construct the static 3D-LUT, performing 3D-LUT post-processing operations such as node modification operations, and so forth.

The TPB model may be built with TPB basis functions that ensure smooth transition and continuity, thereby eliminating or avoiding discontinuity within local neighborhood(s) that may cause sudden color change artifact in a converted/mapped HDR image. Applying the TPB model with using TPB coefficients and TPB basis functions directly in image conversion operations may incur a relatively high computational complexity or cost. In some operational scenarios, a computationally efficient (e.g., static, etc.) 3D-LUT may be built or pre-built from the TPB model. The 3D-LUT may be used at runtime to map or convert images instead of using directly the TPB coefficients and TPB basis functions of the TPB model at runtime. Additionally, optionally or alternatively, the 3D-LUT can be refined, for example by modifying the 3D-LUT in a post-processing stage, into a final static 3D-LUT that can be used to enhance dark regions in mapped or converted HDR images.

By way of example but not limitation, the same (physical) scenes can be captured with two image acquisition devices of the same type and/or model and/or manufacturer to generate two image datasets.

For example, one of the two image acquisition devices may be operated to generate a plurality of raw image files/containers (e.g., DNG still images or image files, etc.) that includes a plurality of (device-generated) camera raw images and a plurality of (device-generated) JPEG SDR images. Each raw image file/container in the plurality of raw image files/containers includes a camera raw image and a (JPEG) SDR image generated from the camera raw image through camera ISP processing by the image acquisition device.

At or around the same time, the other of the two image acquisition devices may be operated to generate an HDR video (e.g., Profile 8.4 video, etc.) that includes a plurality or sequence of (device-generated) HDR images corresponding to or depicting the same scenes as the plurality of camera raw images and the plurality of (JPEG) SDR images. Each HDR image in the plurality of HDR images corresponds to or depicting the same scene as a respective camera raw image in the plurality of camera raw images and a respective (JPEG) SDR image in the plurality of (JPEG) SDR images.

The plurality of HDR images, the plurality of camera images and the plurality of (JPEG) SDR images may be used as or collected into an image dataset that includes a plurality of image combinations. Each image combination in the plurality of image combinations includes an HDR image in the plurality of HDR images, a camera raw image to which the HDR image corresponds, and a (JPEG) SDR image generated through the camera ISP processing from the camera raw image.

In some operational scenarios, images in some or all of the image combinations may be acquired or captured by the two image acquisition devices freehand without any spatial or motion constraints. In some operational scenarios, some or all of the image combinations may be acquired by the two image acquisition devices with spatial or motion constraints such as implemented or set up through tripods.

As the plurality of device-generated (JPEG) SDR images and the plurality of device-generated HDR images, in the image dataset, are acquired with two image acquisition devices, a device-generated (JEPG) SDR image in the plurality of device-generated (JPEG) SDR images may not be spatially aligned with a corresponding device-generated HDR image in the plurality of device-generated HDR images. Feature points may be extracted from the plurality of device-generated (JPEG) SDR images and the plurality of device-generated HDR images and used to perform spatial alignment operations on the plurality of device-generated (JPEG) SDR images and the plurality of device-generated HDR images to generate a plurality of spatially-aligned device-generated (JPEG) SDR images and a plurality of spatially-aligned device-generated HDR images. Some or all SDR pixels in each spatially-aligned device-generated (JPEG) SDR image in the plurality of spatially-aligned device-generated (JPEG) SDR images are spatially aligned with some or all corresponding HDR pixels in a respective spatially-aligned device-generated HDR image in the plurality of spatially-aligned device-generated HDR images.

The plurality of spatially-aligned device-generated (JPEG) SDR images and the plurality of spatially-aligned device generated HDR images may be used as training SDR and HDR images to train or optimize operational parameters that specify or define the TPB conversion/mapping model that predicts or outputs a predicted, mapped or converted HDR pixel or codeword value from an SDR pixel or codeword value as input.

For example, SDR pixel or codeword values in each spatially-aligned device generated (JPEG) SDR images in the plurality of spatially-aligned device-generated (JPEG) SDR images can be used by the TPB model to predict mapped/converted HDR pixel or codeword values as output. Prediction errors may be measured or generated as differences between the (predicted/mapped/converted) HDR pixel or codeword values and corresponding HDR pixel or codeword values in a respective spatially-aligned device generated HR image in the plurality of spatially-aligned device-generated HDR images in the image dataset. The operational parameters for the TPB model may be optimized through minimizing the prediction errors in a model training phase. The TPB model with the optimized parameters may be used to predict converted/mapped HDR pixel or codeword values from SDR pixel or codeword values.

Example feature point extraction, image spatial alignment and TPB model training can be found in U.S. Provisional Patent Application Ser. No. 63/321,390, "Image Optimization in Mobile Capture and Editing Applications," by Guan- Ming Su et al., filed on 18 Mar. 2022, the contents of which are entirely incorporated herein by reference as if fully set forth herein.

The optimized operational parameters for the TPB model (or backward reshaping) may include TPB coefficients denoted as $\{m_B^{ch}\}$, where ch=red or R, green or G, and blue or B, in an RGB domain or color space in which the SDR and HDR images are represented. These TPB coefficients may be used in conjunction with TPB basis functions in the TPB model to generate predicted/converted/mapped HDR pixel or codeword values from SDR pixel or codeword values.

As noted, the TPB model with the optimized TPB coefficients and basis functions may be directly used to predict HDR values from SDR values at a relatively large computational complexity and cost. In some operational scenarios, to reduce runtime computation loads, the TPB model may not be directly deployed at runtime to predict HDR values in mapped/converted HDR images from (non-training) SDR values in SDR image. A static 3D-LUT may be constructed—each dimension of the three dimensions of the 3D-LUT is for predicting component HDR codeword values in a respective dimension or color channel of an output HDR color space in which mapped/converted HDR images are to be represented—before the runtime from the TPB model with the optimized TPB coefficients and basis functions.

By way of illustration but not limitation, each dimension or color channel of an input SDR color space—in which SDR images are represented—such as a RGB color space may be partitioned into N (e.g., equal, non-equal, etc.) partitions, intervals or nodes, where N is a positive integer greater than one (1). Example values for N may include, but are not necessarily limited to only, any of: 17, 33, 65, etc. These N partitions, intervals or nodes in each such dimension or color channel may be represented N respective component SDR codeword values in the dimension or color channel. Each partition, interval or node in the N partitions, intervals or nodes of a dimension or color channel in the N partitions, intervals or nodes may be represented by a corresponding component SDR codeword value in the N respective component SDR codeword values.

The static 3D-LUT includes N×N×N entries. Each entry of the 3D-LUT contains a different combinations of three component SDR codeword values as a lookup key. Each of the three component SDR codeword values is in N component SDR codeword values in one of the dimensions or color channels of the input SDR color space. Each entry has or outputs three mapped/converted component HDR codeword values—as predicted by the TPB model—in each of the three dimensions or color channels of the output HDR color space as a lookup value.

Given an (input) SDR codeword value (e.g., for each pixel of an input SDR image, for the i-th pixel of the input SDR image, etc.) that includes three component SDR codeword values, nearest neighboring partitions, intervals or nodes represented by respective component SDR codeword values (e.g., generated by quantizing or dividing a full codeword range such as a normalized value range of [0, 1] with the total number of partitions, intervals or nodes in each color channel, etc.) that are closest to the component SDR codeword values of the input SDR codeword value can be identified in the partitions, intervals or nodes represented in the static 3D-LUT. Each of the nearest neighboring partitions, intervals or nodes may be identified or indexed with a node index (a, b, c), where $0 \le a, b, c \le N$ and corresponds to a specific entry in the 3D-LUT. A predicted component HDR codeword value in the channel ch may be outputted as a part/component/dimension of a lookup value in the specific entry of the 3D-LUT using the node index identified by or converted from the component SDR codeword values of the input SDR codeword value. Predicted component HDR codeword values in a specific channel denoted as ch of the output HDR color space from some or all entries (of the 3D-LUT) corresponding to the (e.g., two, four, six, eight, etc.) nearest neighboring partitions, intervals or nodes may be used—for example through bilinear interpolation, trilinear interpolation, extrapolation, etc.—to generate an overall or final predicted component HDR codeword denoted as $T_{a,b,c}^{ch}$ for the channel ch.

In some operational scenarios, the 3D-LUT generated from the TPB model may have dark lift issues that elevate brightness levels in predicted HDR codeword values. To address these issues, 3D-LUT post processing operations may be performed to make manual and/or automated adjustments on the 3D-LUT to make dark nodes (or predicted HDR codeword values in dark regions) darker than otherwise.

First, predicted component RGB HDR codeword values for the same node index (a, b, c) as predicted by the static 3D-LUTs for all dimensions or channels of the output HDR color space may be collected together as $(T_{a,b,c}^{R}, T_{a,b,c}^{G}, T_{a,b,c}^{B})$ and mapped to component YCbCr HDR codewords $(T_{a,b,c}^{Y}, T_{a,b,c}^{Cb}, T_{a,b,c}^{Cr})$ via a color space transformation RGBtoYCbCr( ) as follows:

$$(T_{a,b,c}^{Y}, T_{a,b,c}^{Cb}, T_{a,b,c}^{Cr}) = \text{RGBtoYCbCr}(T_{a,b,c}^{R}, T_{a,b,c}^{G}, T_{a,b,c}^{B}) \quad (16)$$

Hence, a 3D-LUT for the YCbCr HDR color space may be constructed from the 3D-LUT generated for the output RGB HDR color space.

Second, a dark range along Y axis/dimension/channel of the YCbCr HDR color space, as specified with a Y codeword value range $[0, Y_D)$, may be partitioned into L intervals. Here, an example value of $Y_D$ may be, but is not necessarily limited to only, 0.3 in the overall normalized Y codeword value range (or domain) [0 1]. The i-th interval (where i=0, 1, . . . , L−1) is within the Y codeword value sub-range $[T_D/Li, Y_D/L(i+1))$. An example value of L may be, but is not necessarily limited to only, 6. For each interval in the L intervals, all YCbCr entries or nodes having Y (or luma) codeword values inside the i-th interval may be collected into a set denoted as $\Omega_i$ (giving rise to L such sets), as follows:

$$\Omega_i = \left\{ (a, b, c) \middle| T_{a,b,c}^{Y} \in \left[\frac{Y_D}{L}i, \frac{Y_D}{L}(i+1)\right) \right\} \quad (17)$$

Third, for each set $\Omega_i$, lookup values of entries or nodes in the static RGB 3D-LUT that correspond to all the YCbCr entries of nodes in the set 22; are reduced (the darker an overall RGB node or codeword value corresponds, the more a component RGB codeword value in each channel or component ch of the overall RGB node or codeword is reduced) as follows:

$$\hat{T}_{a,b,c}^{ch} = \text{clip3}\left(T_{a,b,c}^{ch} - D\frac{L-i}{L}, 0, 1\right) \text{ for all } \{a, b, c\} \in \Omega_i \text{ for } ch = R, G, B \quad (18)$$

An example value of D may be, but is not necessarily limited to only, 0.065. A final 3D-LUT $\{\hat{T}_{a,b,c}^{ch}\}$ that includes these dark codeword adjustments may be used to predict, map or convert SDR codeword values in an SDR image such as the enhanced SDR image from the first stage or processing block of FIG. 1 to mapped/converted HDR codeword values in a mapped/converted HDR image corresponding to the enhanced SDR image.

Figure 3G:
FIG. 3G illustrates example mapped HDR images generated using a static 3D-LUT with and without darkness adjustment post-processing.

FIG. 3G illustrates example HDR images that converted by a static 3D-LUT with and without darkness adjustment post-processing. As shown, the HDR image on the right as generated with a darkness enhanced 3D-LUT $\{\hat{T}_{a,b,c}^{ch}\}$ contains more details in dark regions than the HDR image on the left as generated with a 3D-LUT $\{T_{a,b,c}^{ch}\}$ without darkness enhancement.

HDR Enhancement

A camera ISP in an image acquisition device as described herein may be used to perform many different enhancement processing operations for the purpose of providing visually pleasing looks in output pictures/images. The enhancement processing operations performed with such camera ISP may include, but are not necessarily limited to only, local contrast and image detail enhancements.

To implement or simulate the same or similar visually pleasing looks in mapped or converted HDR images as described herein, an enhancement module may be implemented in the third component or processing block of FIG. 1 to make or output a final HDR image with relatively visually pleasing looks. The enhancement module may operate with or without other available solutions to enhance the images. These other available solutions may include unsharp masking, local Laplacian filtering, proprietary or standard image enhancement operations, etc. In some operational scenarios, in comparison with these other available solutions, techniques as described herein can be used to implement a relatively simple and effective solution to enhance images within the same dynamic range—e.g., to enhance a mapped or converted HDR image generated from the second component or processing block of FIG. 1 into a final enhanced mapped or converted HDR image within the same dynamic range or HDR.

Figure 2C:
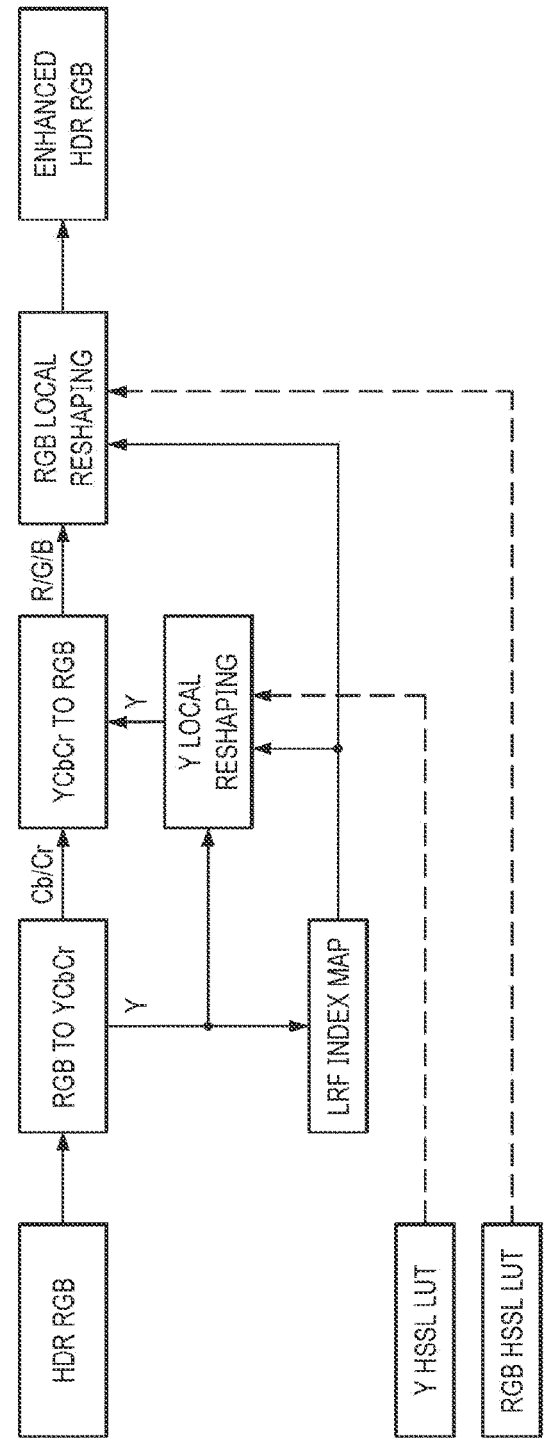
FIG. 2C illustrates example image enhancement.

FIG. 2C illustrates an example third main component or processing block of FIG. 1 for image enhancement. As shown in FIG. 2C, the framework includes Y (or brightness contrast) local reshaping and RGB (or R/G/B saturation) local reshaping among other things. Before performing these local reshaping operations in connection with an input HDR image (e.g., a mapped or converted HDR image generated from the second main component or processing block of FIG. 1, etc.), a family of Hybrid Shifted Sigmoid functions with linear mapping (HSSL) LUTs may be built or constructed.

In some operational scenarios, each dimension or color channel (e.g., any of Y/R/G/B, etc.) of some or all dimensions or color channels (e.g., Y/R/G/B, etc.) in which local reshaping is to be performed can make use of its own distinct HSSL LUTs different from other HSSL LUTs used with other dimensions or color channels.

In some operational scenarios, each dimension or color channel (e.g., any of R/G/B, any of Y/R/G/B, etc.) of some or all dimensions or color channels in which local reshaping is to be performed can make use of or share the same HSSL LUTs as used with other dimensions or color channels.

As shown in FIG. 2C, the input HDR image (denoted as "HDR RGB") may be first converted with an RGB-to-YCbCr color space transformation into an HDR image in a YCbCr domain or color space. Y or luma codewords of the HDR image in the Y channel can be processed (e.g., local average Y values or mid-L values, etc.) and used to generate a local reshaping function (LRF) index map—which, for example, may comprise (e.g., per-pixel, per-pixel block, etc.) local average Y values or mid-L values as (e.g., per-pixel, per-pixel block, etc.) LRF indexes.

A luma reshaping module (denoted as "Y local reshaping") as shown in FIG. 2C receives or takes an Y channel codeword value for each pixel in the HDR image in the YCbCr color space, uses an LRF index in the LRF index map corresponding to the pixel to find or select an applicable LUT—among a family of Y-channel HSSL LUTs—for the pixel, and uses the selected LUT to map the Y channel codeword value to an enhanced or locally reshaped Y channel codeword value. The enhanced Y channel codeword value can be combined with (original or non-enhanced or non-locally reshaped) Cb and Cr codeword values in the HDR image in the YCbCr color space in an YCbCr-to-RGB color space transformation back to RGB codeword value for the pixel in a luminance enhanced HDR image in the RGB domain or color space.

The Y-channel enhancement operation performed with the above discussed Y-channel local reshaping may be followed by an R/G/B enhancement operation performed with R/G/B local reshaping.

For each color channel in the RGB color space, an R/G/B reshaping module (denoted as "RGB local reshaping") as shown in FIG. 2C receives or takes a per-channel (R or G or B) luminance enhanced codeword value for each pixel for each channel in the HDR image in the RGB color space, uses a per-channel LRF index in the LRF index map corresponding to the pixel and the channel to find or select an applicable LUT—among a family of per-channel HSSL LUTs for the channel (denoted as RGB HSSL LUT for simplicity)—for the pixel, and uses the selected LUT to map the per-channel luminance enhanced codeword value to a final enhanced or locally reshaped per-channel codeword value for the channel in an enhanced or output HDR image (denoted as "Enhanced HDR RGB").

For the purpose of illustration only, it has been described that RGB local reshaping may follow Y-channel local reshaping to generate an enhanced or output HDR image. It should be noted that, in other embodiments, Y-channel local reshaping may follow RGB local reshaping to generate an enhanced or output HDR image. Additionally, optionally or alternatively, in some operational scenarios, Y-channel only local reshaping-without separate RGB local reshaping—may be performed to generate a final enhanced or output HDR image. Additionally, optionally or alternatively, in some operational scenarios, RGB only local reshaping—without separate Y-channel local reshaping—may be performed to generate a final enhanced or output HDR image.

Hybrid Shifted Sigmoid with Linear (HSSL) LUT

A family of HSSL LUTs may be constructed for a single color channel (denoted as ch) or for some or all color channels. The family of HSSL LUTs may include a total number K (e.g., 1024, 4096, etc.) of different (HSSL) LUTs or local reshaping functions. These different (HSSL) LUTs or local reshaping functions may be respectively indexed by LRF index k from 0 to K−1. Each LUT may be built by merging shifted sigmoid and linear functions and characterized with a set of parameters as illustrated in TABLE 1 below.

TABLE 1

| | |
|---|---|
| $c^{(ch,k)}$: | center of sigmoid curve |
| $g_L^{(ch,k)}$: | distance from most left point of sigmoid curve to center of sigmoid curve. |

TABLE 1-continued

| | |
|---|---|
| $g_R^{(ch,k)}$: | distance from rightest point of sigmoid curve to center of sigmoid curve. |
| $m_L^{(ch,k)}$: | slope used in the left sigmoid curve |
| $m_R^{(ch,k)}$: | slope used in the right sigmoid curve |

Figure 3H:
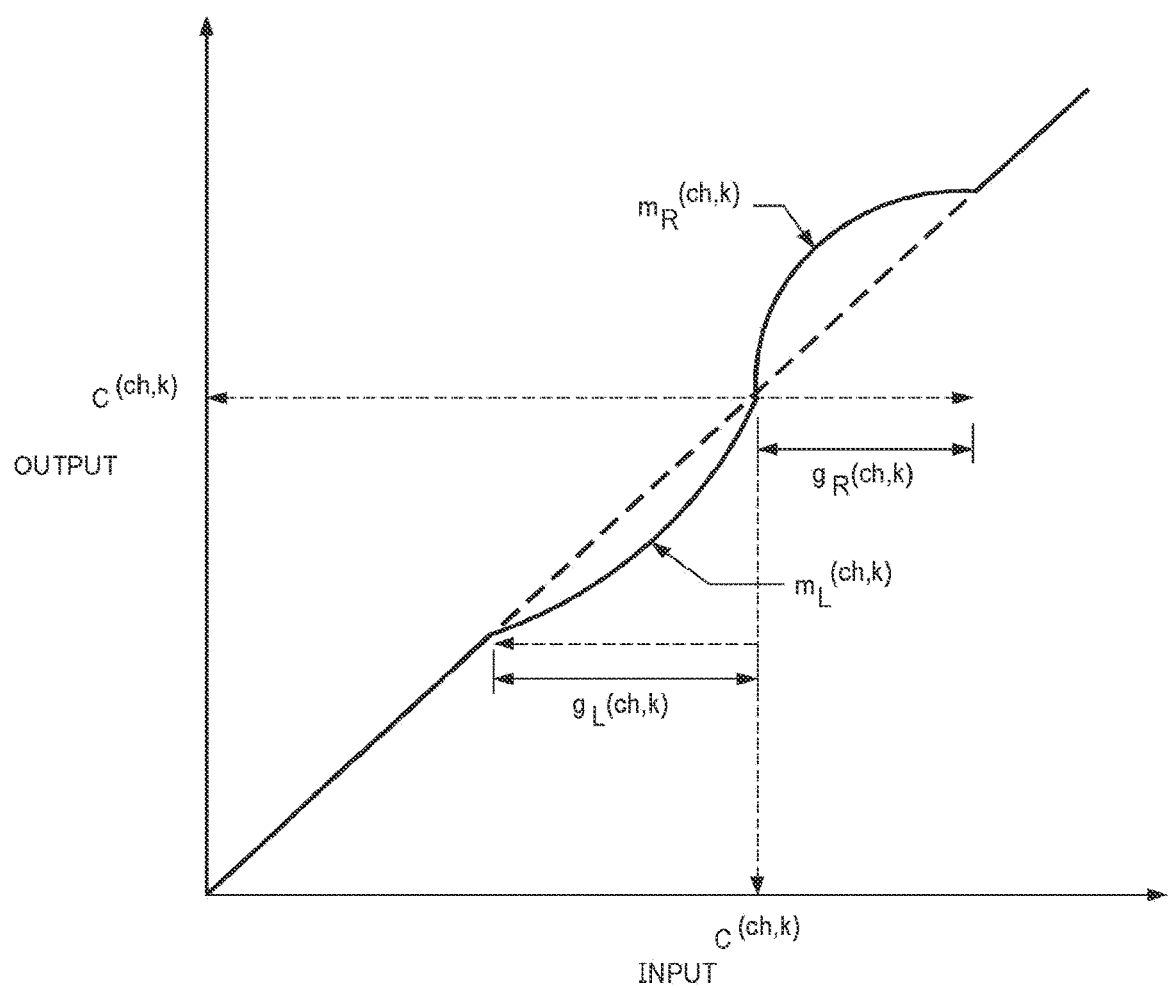
FIG. 3H illustrates an example curve for generating hybrid shifted sigmoid lookup tables (HSSL LUTs)

FIG. 3H illustrates an example curve used to generate an LUT in the family of HSSL LUTs. As shown, the curve giving rise to the LUT may include a left (L) sigmoid function segment and a right (R) sigmoid function segment joining at a center as given by the parameter $c^{(ch,k)}$. The left and right sigmoid function segments may be specified with two sigmoid function—which may be referred to a left sigmoid function and a right sigmoid function without loss of generality—with two slopes as respectively indicated by the parameters $m_L^{(ch,k)}$ and $m_R^{(ch,k)}$, respectively. The left and right sigmoid function segments further join with two linear segments-which may be referred to a left line segment and a right line segment without loss of generality—of slope one (1) at lower and upper points located at distances $g_L^{(ch,k)}$ and $g_R^{(ch,k)}$, respectively, in relation to the center as given by the parameter $c^{(ch,k)}$.

A sigmoid function used to represent a sigmoid function segment as described herein may be expressed as a function with a slope denoted as m, as follows:

$$sig(x, m) = \frac{1}{1 + \exp(-m(x - 0.5))} \tag{19}$$

With different slope values for m, maximum and minimum values of the sigmoid function over a support of x in a value range [0, 1] are different.

Maximum and minimum values of the left and right sigmoid functions used to specify the left and right sigmoid function segments of FIG. 3H may be expressed as follows:

$$sig_{L,max}^{(ch,k)} = \max\{sig(x, m_L^{(ch,k)}) \forall x \in [0\ 1]\} \tag{20-1}$$

$$sig_{L,min}^{(ch,k)} = \min\{sig(x, m_L^{(ch,k)}) \forall x \in [0\ 1]\} \tag{20-2}$$

$$sig_{R,max}^{(ch,k)} = \max\{sig(x, m_R^{ch,k}) \forall x \in [0\ 1]\} \tag{20-3}$$

$$sig_{R,min}^{(ch,k)} = \max\{sig(x, m_R^{(ch,k)}) \forall x \in [0\ 1]\} \tag{20-4}$$

The maximum and minimum values in expressions (20) above may be used as normalization factors to define left and right scaled sigmoid functions as follows:

$$\widetilde{sig}_L^{(ch,k)}(x) = \tag{21-1}$$

$$2g_L^{(ch,k)}\left(\frac{sig\left(\frac{x}{2g_L^{(ch,k)}}, m_L^{(ch,k)}\right) - sig_{L,min}^{(ch,k)}}{sig_{L,max}^{(ch,k)} - sig_{L,min}^{(ch,k)}} - 0.5\right) \text{ for } x \in \left[0, 2g_L^{(ch,k)}\right]$$

$$\widetilde{sig}_R^{(ch,k)}(x) = \tag{21-2}$$

$$2g_R^{(ch,k)}\left(\frac{sig\left(\frac{x}{2g_R^{(ch,k)}}, m_R^{(ch,k)}\right) - sig_{R,min}^{(ch,k)}}{sig_{R,max}^{(ch,k)} - sig_{R,min}^{(ch,k)}} - 0.5\right) \text{ for } x \in \left[0, 2g_R^{(ch,k)}\right]$$

The left and right scaled sigmoid functions in expressions (21) may be shifted in relation to the center c (ch,k) to give rise to left and right shifted sigmoid functions as follows:

$$LRF_L^{(ch,k)}(x) = \widetilde{sig}_L^{(ch,k)}(x) + c^{(ch,k)} \text{ for } x \in [0, g_L^{(ch,k)}] \quad (22\text{-}1)$$

$$LRF_R^{(ch,k)}(x) = \widetilde{sig}_R^{(ch,k)}(x) + c^{(ch,k)} \text{ for } x \in [g_R^{(ch,k)}, 2g_R^{(ch,k)}] \quad (22\text{-}2)$$

The k-th local reshaping function (which may be used to generate a corresponding HSSL LUT) may be initially set to a default 1:1 mapping: $LRF^{(ch,k)}(x) = x$. In addition, the center $c^{(ch,k)}$ for the k-th local reshaping function may be set to k/K.

Left and right regions, of the default function $LRF^{(ch,R)}(x)$, around the center $c^{(ch,k)}$ may be replaced with the left and right shifted scaled sigmoid function in expressions (22) above. More specifically, the default $LRF^{(ch,k)}(x)$ for the left region or segment $\vartheta_L^{(ch,k)} = x \in [\max(0, c^{(ch,k)} - g_L^{(ch,k)}), c^{(ch,k)})$ may be replaced by $LRF_L^{(ch,k)}(x)$ in expression (22-1). As the left region or segment might be shorter or smaller than $g_L^{(ch,k)}$, maximum and minimum values of $LRF_L^{(ch,k)}(x)$ can be computed as follows:

$$LRF_{L,max}^{(ch,k)} = \max\{LRF_L^{(ch,k)}(x), \forall x \in \vartheta_L^{(ch,k)}\} \quad (23\text{-}1)$$

$$LRF_{L,min}^{(ch,k)} = \min\{LRF_L^{(ch,k)}(x), \forall x \in \vartheta_L^{(ch,k)}\} \quad (23\text{-}2)$$

These maximum and minimum values can be used in normalization or scaling to avoid generating negative (output) local reshaping functional values, if $LRF_{L,min}^{(ch,k)} < 0$, as follows:

$$\widetilde{LRF}_L^{(ch,k)}(x) = LRF_{L,max}^{(ch,k)} \frac{LRF^{(ch,k)}(x) - LRF_{L,min}^{(ch,k)}}{LRF_{L,max}^{(ch,k)} - LRF_{L,min}^{(ch,k)}} \quad (24)$$

The final (output) local reshaping function values in the left region or segment may be given as follows:

$$LRF^{(ch,k)}(x) = \begin{cases} \widetilde{LRF}_L^{(ch,k)}(x) & \text{if } LRF_{L,min}^{(ch,k)} < 0 \\ LRF_L^{(ch,k)}(x) & \text{if } LRF_{L,min}^{(ch,k)} \geq 0 \end{cases} \quad (25)$$

Similarly, the default local reshaping function $LRF^{(ch,R)}(x)$ may be replaced by $LRF_R^{(ch,k)}(x)$ in expression (22-2) for the right region or segment $\vartheta_R^{(ch,k)} = x \in [c^{(ch,k)}, \min(1, c^{(ch,k)} + g_R^{(ch,k)})]$. As the right region or segment might be shorter or smaller than $g_R^{(ch,k)}$, maximum and minimum values of $LRF_R^{(ch,k)}(x)$ can be computed as follows:

$$LRF_{R,max}^{(ch,k)} = \max\{LRF_R^{(ch,k)}(x), \forall x \in \vartheta_R^{(ch,k)}\} \quad (26\text{-}1)$$

$$LRF_{R,min}^{(ch,k)} = \min\{LRF_R^{(ch,k)}(x), \forall x \in \vartheta_R^{(ch,k)}\} \quad (26\text{-}2)$$

These maximum and minimum values can be used in normalization or scaling to avoid generating negative (output) local reshaping functional values, if $LRF_{R,max}^{(ch,k)} > 1$, as follows:

$$\widetilde{LRF}_R^{(ch,k)}(x) = \left(1 - LRF_{R,min}^{(ch,k)}\right) \frac{LRF^{(ch,k)}(x) - LRF_{R,min}^{(ch,k)}}{LRF_{R,max}^{(ch,k)} - LRF_{R,min}^{(ch,k)}} + LRF_{R,min}^{(ch,k)} \quad (27)$$

The final (output) local reshaping function values in the right region or segment may be given as follows:

$$LRF^{(ch,k)}(x) = \begin{cases} \widetilde{LRF}_R^{(ch,k)}(x) & \text{if } LRF_{R,max}^{(ch,k)} > 1 \\ LRF_R^{(ch,k)}(x) & \text{if } LRF_{R,max}^{(ch,k)} \leq 1 \end{cases} \quad (28)$$

Figure 3I:
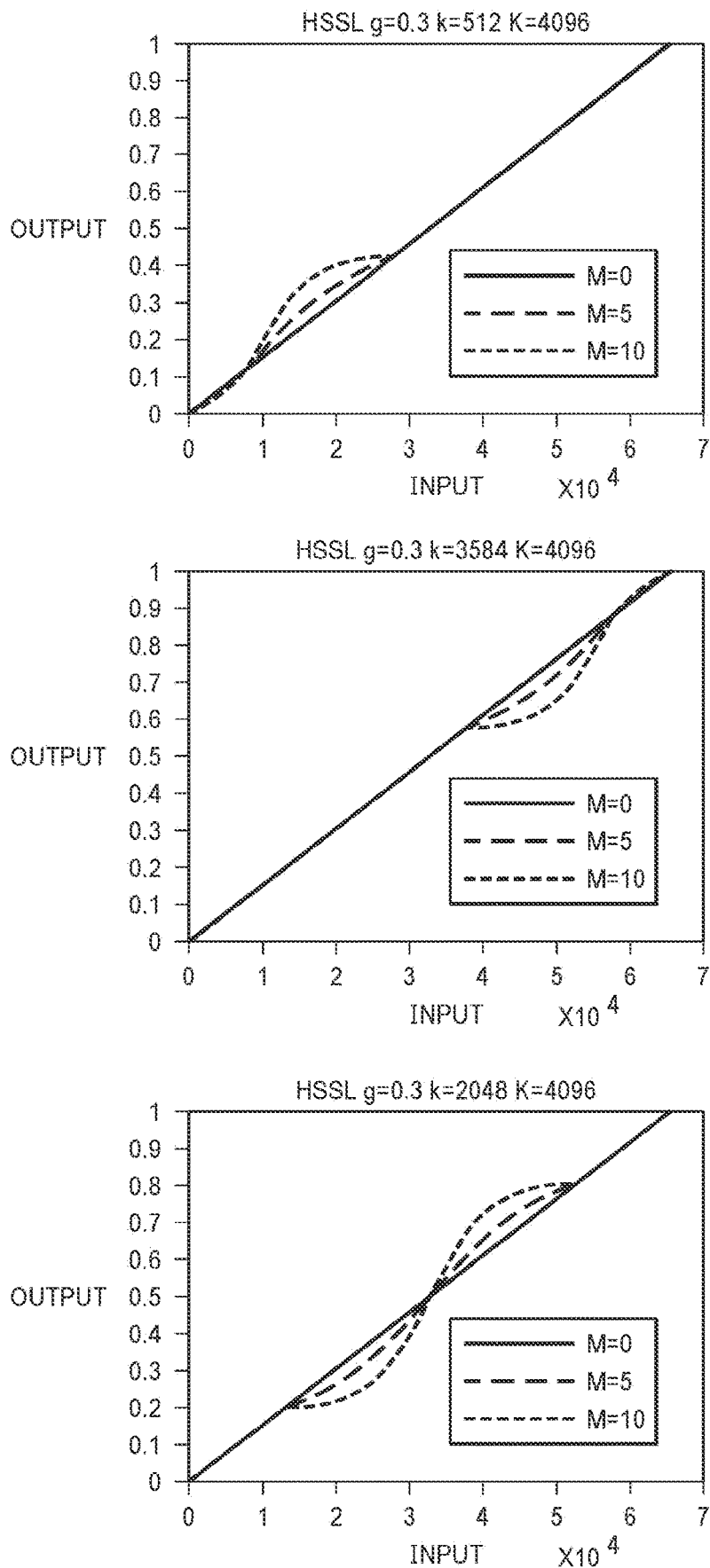
FIG. 3I and FIG. 3J illustrate example local reshaping functions.

FIG. 3I illustrates example local reshaping functions (belonging to a family of K=4096 different local reshaping functions) with k=512, 2048, and 3584, respectively, where $g_L^{(ch,k)} = 0.3$, $g_R^{(ch,k)} = 0.3$. As shown, these local reshaping functions can vary with the left sigmoid function segment slope $m_L^{(ch,k)} = \{0, 5, 10\}$ alone, with the right sigmoid function segment slope $m_R^{(ch,k)} = \{0, 5, 10\}$ alone, or with both the left and right sigmoid function segment slopes $m_L^{(ch,k)}$ and $m_R^{(ch,k)}$. The larger slope values $m_L^{(ch,k)}$ and $m_R^{(ch,k)}$ are, the stronger the local contrasts are provided with these local reshaping functions.

Figure 3J:
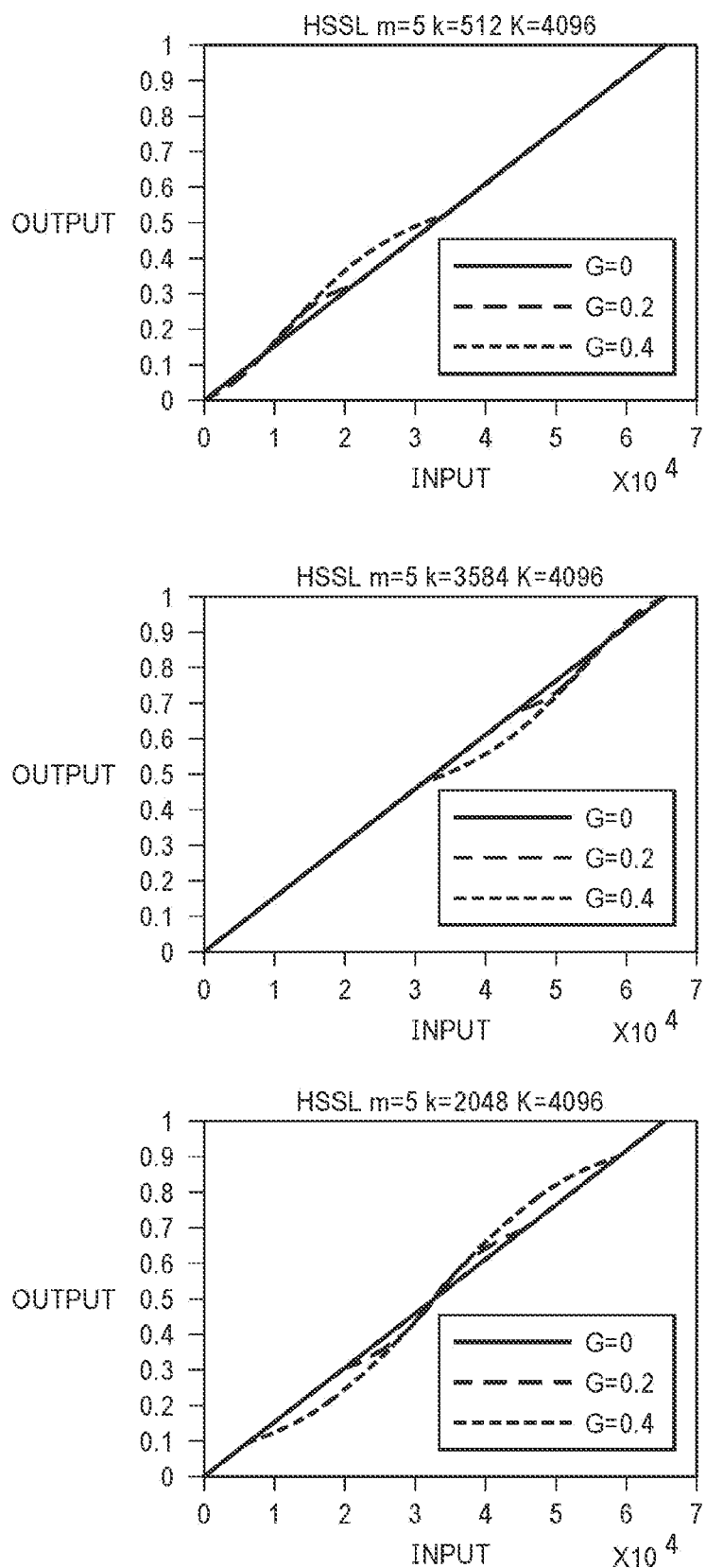

FIG. 3J illustrates example local reshaping functions (belonging to a family of K=4096 different local reshaping functions) with k=512, 2048, and 3584, respectively, where $m_L^{(ch,k)} = 5$, $m_R^{(ch,k)} = 5$. As shown, these local reshaping functions can vary with the left region or segment size (as measured from the center $c^{(ch,k)}$) $g_L^{(ch,k)} = \{0, 0.2, 0.4\}$ alone, with the right region or segment size (as measured from the center $c^{(ch,k)}$) $g_R^{(ch,k)} = \{0, 0.2, 0.4\}$ alone, or with both the left and right region or segment sizes $g_L^{(ch,k)}$ and $g_R^{(ch,k)}$. The larger $g_L^{(ch,k)}$ and $g_R^{(ch,k)}$ are, the larger the modification regions are.

Local Reshaping Function (LRF) Index Map

Once a family of HSSL LUTs or local reshaping functions $LRF^{(ch,k)}(x)$ are generated, a local reshaping function (LRF) index map may be generated from an input HDR image and used to select different HSSL LUTs or different local reshaping functions for reshaping different pixels in the input HDR image into a final enhanced or locally reshaped HDR image.

By way of illustration but not limitation, take Y channel local reshaping as an example. For each pixel in the input HDR image, luma or brightness for the pixel may be locally reshaped or enhanced with an applicable HSSL LUT or local reshaping function specifically selected for the pixel, thereby increase saturations or contrasts (brightness differences) among pixels of a local neighborhood around each pixel.

As noted, a curve giving rise to each HSSL LUT or local reshaping function in the family of HSSL LUTs or local reshaping functions is more or less linear except for regions/segments replaced with shifted/scaled sigmoid curves. The center joining left and right sigmoid curve segments may be located differently for each such curve, for example depending on the parameter k corresponding to an LRF index such as a local average (luma value) or a mid-L value. Hence, the local average may be computed for each pixel's local neighborhood and used to select a specific local reshaping function with the center given as the local average. Pixel or codeword values within the local neighborhood can use the specific local reshaping function to boost or enhance brightness differences or contrasts or saturation levels or differences, thereby enhancing visual looks of the final enhanced image.

A challenge to be addressed with using local averages to select local reshaping functions is how to compute the local averages while avoiding generating visual artifacts such as halos near edges separating different image details of different average brightness levels. As noted, a guided filter is an edge aware (or edge preserving) filter and hence can be applied to selecting computing local averages used to select local reshaping functions.

Denote the i-th pixel of the input HDR image (of a size W×H, where W is a non-zero positive integer represent the total number of pixels in a row and H is a non-zero positive integer represent the total number of pixels in a column) as $v_i$.

A number of different types of filters used to generate the LRF index map include a Gaussian filter denoted as follows:

$$Y = \text{GAUSS}(X, \sigma_g) \tag{29}$$

where Y represents a Gaussian blurred or filtered image/map from applying Gaussian filtering with a standard deviation $\sigma_g$ to a pre-filtered image/map X.

In some operational scenarios, Gaussian blurring or filtering may be sped up, for example using iterative box filter to approximate Gaussian filter. Example approximation of Gaussian filter with iterative box filter is described in Pascal Getreuer, "A Survey of Gaussian Convolution Algorithms," Image Processing On Line, vol. 3, pp. 286-310 (2013); William M. Wells, "Efficient Synthesis of Gaussian Filters by Cascaded Uniform Filters," IEEE Transactions on Pattern Analysis and Machine Intelligence, vol. 8, no. 2, pp. 234-239 (1986), the contents of which are incorporated herein by reference in its entirety.

A gradient filter may be used to compute local gradients Y of an image or map X as follows:

$$Y = \text{GRAD}(X) \tag{30}$$

In some operational scenarios, a Sobel filter may be used as the gradient filter for the purpose of generating local gradients in an image or map. Example local reshaping operations such as related to Gaussian blurring, Sobel and multi-level guided filters are described in U.S. Provisional Patent Application Ser. No. 63/086,699, "ADAPTIVE LOCAL RESHAPING FOR SDR-TO-HDR UP-CONVERSION," by Tsung-Wei Huang et al., filed on Oct. 2, 2020, the contents of which are incorporated herein by reference in its entirety.

A guided filter may be used to generate a guided filtered image or map Y of an image or map X as follows:

$$Y = \text{GUIDE}(X, I, B_g) \tag{31}$$

where I represents a guided image and $B_g$ represents a dimension of a local neighborhood used in guided filtering.

In some operational scenarios, multi-level (a total of T levels) filtering may be performed to generate the LRF index map.

A common feature map (or image) may be created for all levels in the multi-level filtering first, as follows:

$$\{\vec{v}_i\} = \text{GRAD}(\text{GAUSS}\{v_i\}, \sigma_g^{(0)}) \tag{32}$$

This common feature map (or image) may be used by each level of the multi-level filtering to generate a respective filtered map by an example procedure illustrated in TABLE 2 below.

A weighted combination from filtered images $\hat{v}_i^{(t)}$ of all these multiple levels may be generated as follows:

$$\tilde{f}_i = \sum_{t=1}^{T} w^{(t)} \cdot \hat{v}_i^{(t)} \tag{33}$$

where $w^{(t)}$ represents weighting factors used to obtain a normalized LRF index within a normalized LRF value range [0, 1].

The LRF map index for the t-th pixel may be computed as follows:

$$f_i = \text{clip3}(\text{round}(K \cdot \tilde{f}_i), 0, K-1) \tag{34}$$

where $f_i \in [0, 1, \ldots, K-1]$.

As a non-limiting example, T=2. $w^{(1)}=0.7$, $w^{(2)}=0.3$, $B_g^{(1)}=12$, $B_g^{(2)}=100$.

Local Reshaping Mechanism

Given a family of HSSL LUTs or local reshaping functions $\{\text{LRF}^{(ch,k)}(x)\}$ to be used for a color channel ch and an LRF index map and an LRF index map $\{f_i\}$ generated from an input HDR image, local reshaping may be performed on input HDR codewords of the input HDR image to generate corresponding locally reshaped HDR codewords for the color channel. The locally reshaped HDR codewords for the color channel ch may be combined or further enhanced with other locally reshaped HDR codewords in one or more other color channels to generate final or enhanced HDR codewords in some or all color channels of a final or enhanced HDR image.

More specifically, for the color channel ch, given an input HDR pixel or codeword value $v_i$ for the i-th pixel, an LRF index $f_i$ in the LRF index map $\{f_i\}$ for the i-th pixel may be used to select or look up an HSSL LUT or local reshaping function denoted as $\text{LRF}^{(ch,fi)}(\ )$ from the family of HSSL LUTs or local reshaping functions $\{\text{LRF}^{(ch,k)}(x)\}$. A locally reshaped HDR pixel or codeword denoted as $\dot{v}_i$ may be generated with the selected HSSL LUT or local reshaping function $\text{LRF}^{(ch,fi)}(\ )$ using the input HDR pixel or codeword value $v_i$ for the i-th pixel, as follows:

$$\dot{v}_i = \text{LRF}^{(ch,fi)}(v_i) \tag{35}$$

As noted, a locally reshaped HDR pixel or codeword value may be further locally reshaped or enhanced in other color channel(s). Operational parameters to control amounts (e.g., slopes, region/segment sizes, etc.) of local reshaping enhancement for a given channel ch may include, but not necessarily limited to only, some or all of: $\{g_L^{(ch,k)}\}$,

TABLE 2

For each (the t-th) level, where t = 1, 2, . . . , T
  STEP a): Find or generate a guidance image as follows:
   $\{\vec{v}_i^{(t)}\} = \text{GAUSS}(\{\vec{v}_i\}, \sigma_g^{(t)})$
   $\{\vec{e}_i^{(t)}\} = \varphi \cdot \{v_i\} - \text{GAUSS}(\{v_i\}, \sigma_g^{(t)})) / (\{\vec{v}_i^{(t)}\} + \varepsilon)$
   where "./" denotes the pixelwise dot division.
   An example value of scalar o may be, but is not necessarily limited to only: 1.
  STEP b): Compute or determine the guided filter neighborhood size $B_g^{(t)} = \min\left(B_g^{(t)}, \text{round}\left(\frac{\min(W, H)}{2}\right) - 1\right)$ where $B_g^{(t)}$ on the right hand side may be a configured or pre-configured value for the t-th level.
  STEP c): Perform guided filtering to generate the filtered image for the t-th level as follows:

$\{\hat{v}_i^{(t)}\} = \text{GUIDE}(\{v_i\}, \{\vec{e}_i^{(t)}\}, B_g^{(t)})$ $\{g_R^{(ch,k)}\}$, $\{m_L^{(ch,k)}\}$; $\{m_R^{(ch,k)}\}$ for each LRF index k supported in a family of HSSL LUTs or local reshaping functions as described herein.

In some operational scenarios, a computing device that performs image conversion and/or enhancement operations as described herein such as an image acquisition device, a mobile device, a camera, etc., may be configured or pre-configured with operational or functional parameters specifying each of some or all local reshaping functions in the family.

Additionally, optionally or alternatively, in some operational scenarios, each of some or all local reshaping functions in the family may be represented with a corresponding (HSSL) LUT generated with a respective local reshaping function in the family of local reshaping functions, thereby giving rise to a corresponding family of HSSL LUTs generated from a corresponding family of local reshaping functions. A computing device that performs image conversion and/or enhancement operations as described herein such as an image acquisition device, a mobile device, a camera, etc., may be configured or pre-configured with operational or functional parameters specifying each of some or all HSSL LUTs in the family of HSSL LUTs generated from the corresponding family of local reshaping functions.

Example Process Flows

Figure 4B:
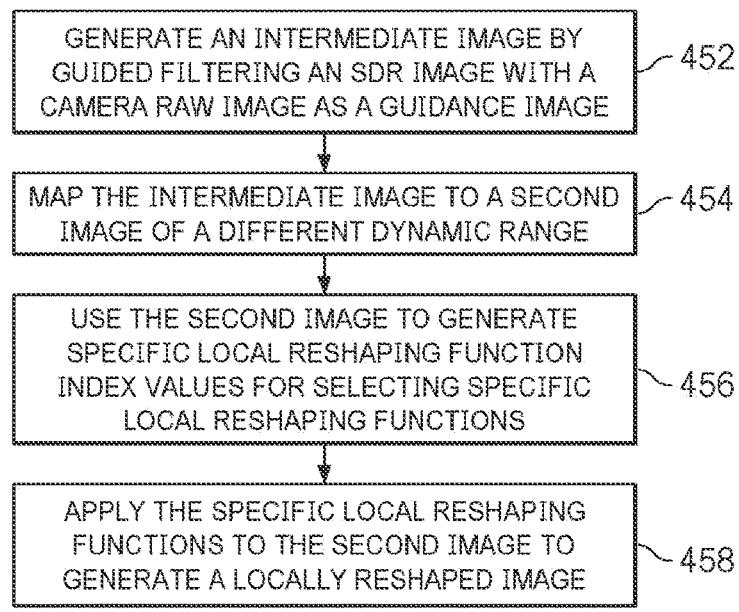

FIG. 4B illustrates an example process flow according to an embodiment. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 452, an image processing system applies guided filtering, with a camera raw image as a guidance image, to a first image of a first dynamic range to generate an intermediate image of the first dynamic range, the first image of the first dynamic range having been generated from the camera raw image with an image signal processor of an image acquisition device.

In block 454, the image processing system performs a dynamic range mapping on the intermediate image of the first dynamic range to generate a second image of a second dynamic range different from the first dynamic range.

In block 456, the image processing system uses the second image of the second dynamic range to generate specific local reshaping function index values for selecting specific local reshaping functions for the second image of the second dynamic range.

In block 458, the image processing system applies the specific local reshaping functions to the second image of the second dynamic range to generate a locally reshaped image of the second dynamic range.

In an embodiment, the specific local reshaping function index values collectively form a local reshaping function index value map.

In an embodiment, the first dynamic range represents a standard dynamic range; the second dynamic range represents a high dynamic range.

In an embodiment, each local reshaping function index value of the specific local reshaping function index values is used to look up a corresponding local reshaping function in a family of local reshaping functions.

In an embodiment, each local reshaping function in the specific local reshaping functions is represented by a corresponding lookup table.

In an embodiment, each local reshaping function in the specific local reshaping functions represents a hybrid shifted sigmoid function.

In an embodiment, each of the specific local reshaping functions reshapes component codewords, in a color channel, derived from the second image into locally reshaped component codewords in the color channel.

In an embodiment, the guided filtering includes first guided filtering with a relatively small spatial kernel and second guided filtering with a relatively large spatial kernel.

In an embodiment, the first guided filtering with the relatively small spatial kernel is used to recover image details, relating to edges, in the camera raw image but lost in the first image; the second guided filtering with the relatively large spatial kernel is used to recover image details, relating to dark and bright regions, in the camera raw image but lost in the first image.

In an embodiment, the intermediate image is fused from a first guided filtered image generated from the first guided filtering with the relatively small spatial kernel and a second guided filtered image generated from the second guided filtering with the relatively large spatial kernel.

In an embodiment, a smoothened binarized local standard deviation map is generated from the first image; weighting factors used to fuse the first guided filtered image and the second guided filtered image are determined based at least in part on the smoothened binarized local standard deviation map.

In an embodiment, a dynamic range mapping represents a tensor product B-spline (TPB) mapping.

In an embodiment, the dynamic range mapping represents a static mapping specified with optimized operational parameters generated in a model training phase using training images of the first and second dynamic ranges derived from spatially aligning captured images of the first and second dynamic ranges.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the inventio comprise computer processors which execute software instructions which cause the processors to perform a method of the disclosure. For example, one or more processors in a display, an encoder, a set top box, a transcoder or the like may implement methods related to adaptive perceptual quantization of HDR images as described above by executing software instructions in a program memory accessible to the processors. Embodiments of the invention may also be provided in the form of a program product. The program product may comprise any non-transitory medium which carries a set of computer-readable signals comprising instructions which, when executed by a data processor, cause the data processor to execute a method of an embodiment of the invention. Program products according to embodiments of the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
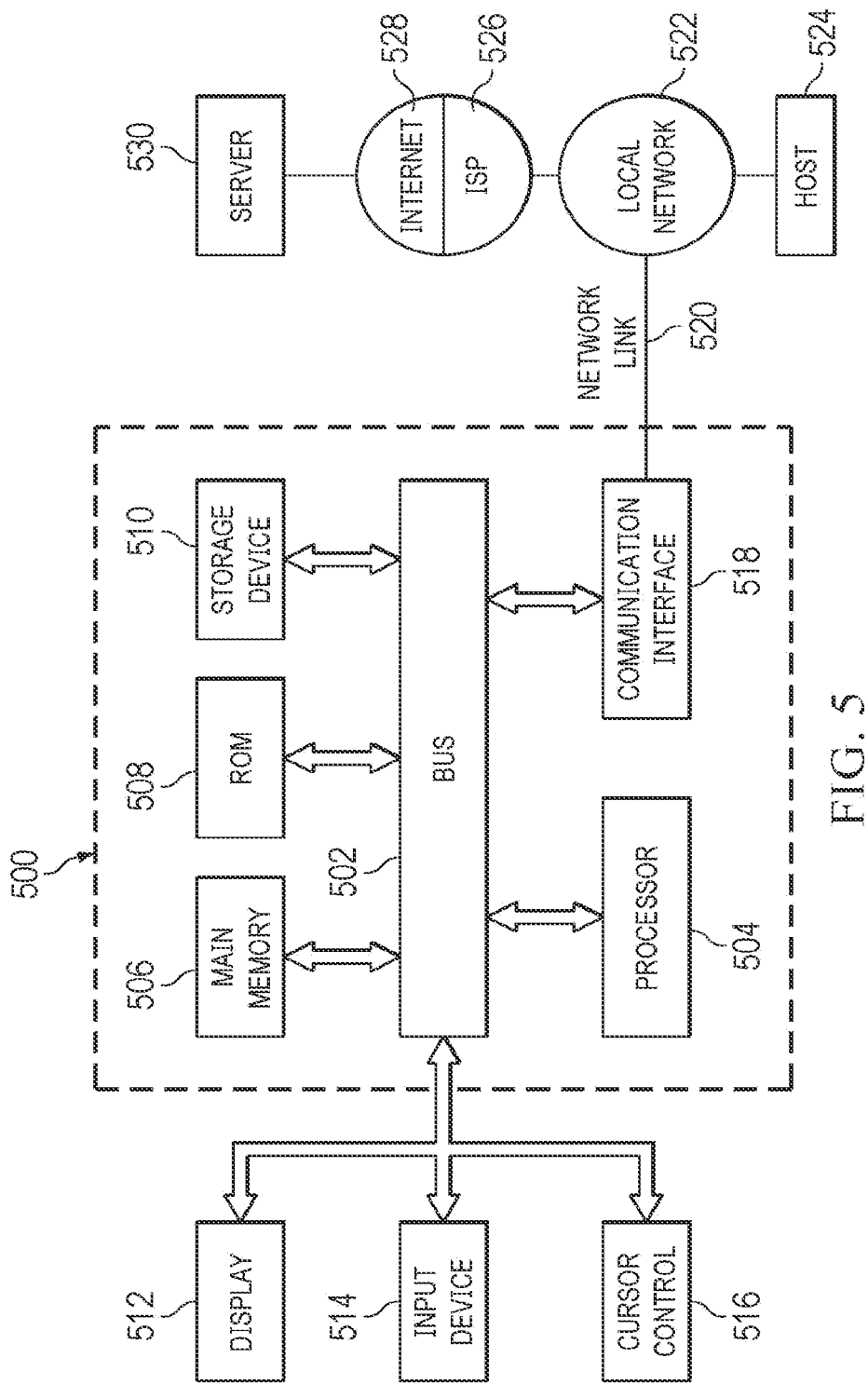
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is claimed embodiments of the invention, and is intended by the applicants to be claimed embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Enumerated Exemplary Embodiments

The invention may be embodied in any of the forms described herein, including, but not limited to the following Enumerated Example Embodiments (EEEs) which describe structure, features, and functionality of some portions of embodiments of the present invention.

EEE1. A method comprising:
applying guided filtering, with a camera raw image as a guidance image, to a first image of a first dynamic range to generate an intermediate image of the first dynamic range, the first image of the first dynamic range having been generated from the camera raw image with an image signal processor of an image acquisition device;
performing a dynamic range mapping on the intermediate image of the first dynamic range to generate a second image of a second dynamic range different from the first dynamic range;
using the second image of the second dynamic range to generate specific local reshaping function index values for selecting specific local reshaping functions for the second image of the second dynamic range;
applying the specific local reshaping functions to the second image of the second dynamic range to generate a locally reshaped image of the second dynamic range.

EEE2. The method of EEE1, wherein the specific local reshaping function index values collectively form a local reshaping function index value map.

EEE3. The method of EEE1 or EEE2, wherein the first dynamic range represents a standard dynamic range; wherein the second dynamic range represents a high dynamic range.

EEE4. The method of any of EEE1-EEE3, wherein each local reshaping function index value of the specific local reshaping function index values is used to look up a corresponding local reshaping function in a family of local reshaping functions.

EEE5. The method of any of EEE1-EEE4, wherein each local reshaping function in the specific local reshaping functions is represented by a corresponding lookup table.

EEE6. The method of any of EEE1-EEE5, wherein each local reshaping function in the specific local reshaping functions represents a hybrid shifted sigmoid function.

EEE7. The method of EEE6, wherein the hybrid shifted sigmoid function is constructed by joining, at a mid-point, a first sigmoid function of a first segment length with a first slope located left to the mid-point and a second sigmoid function of a second segment length with a second slope located right to the mid-point.

EEE8. The method of EEE7, wherein each of the specific local reshaping functions is selected from a family of local reshaping functions; wherein each local reshaping functions in the family of local reshaping functions is indexed with a respective local reshaping function index value in an index value range; wherein each local reshaping functions in the family of local reshaping functions is generated from the hybrid shifted sigmoid function based on a distinct combination of values for the mid-point, the first segment length, the first slope, the second segment length and the second slope.

EEE9. The method of any of EEE1-EEE8, wherein each of the specific local reshaping functions reshapes component codewords, in a color channel, derived from the second image into locally reshaped component codewords in the color channel.

EEE10. The method of any of EEE1-EEE9, wherein the guided filtering includes first guided filtering with a relatively small spatial kernel and second guided filtering with a relatively large spatial kernel.

EEE11. The method of EEE10, wherein the first guided filtering with the relatively small spatial kernel is used to recover image details, relating to edges, in the camera raw image but lost in the first image; wherein the second guided filtering with the relatively large spatial kernel is used to recover image details, relating to dark and bright regions, in the camera raw image but lost in the first image.

EEE12. The method of EEE10 or EEE11, wherein the intermediate image is fused from a first guided filtered image generated from the first guided filtering with the relatively small spatial kernel and a second guided filtered image generated from the second guided filtering with the relatively large spatial kernel.

EEE13. The method of claim 12, wherein a smoothened binarized local standard deviation map is generated from the first image; wherein weighting factors used to fuse the first guided filtered image and the second guided filtered image are determined based at least in part on the smoothened binarized local standard deviation map.

EEE14. The method of any of EEE1-EEE13, wherein a dynamic range mapping represents a tensor product B-spline (TPB) mapping.

EEE15. The method of any of EEE1-EEE14, wherein the dynamic range mapping represents a static mapping specified with optimized operational parameters generated in a model training phase using training images of the first and second dynamic ranges derived from spatially aligning captured images of the first and second dynamic ranges.

EEE16. The method of any of EEE1-EEE15, wherein the dynamic range mapping is represented by a three-dimensional lookup table (3D-LUT) that includes a plurality of entries that map input three-dimensional codewords into predicted three-dimensional codewords in a mapped RGB color space; the method further comprising:
converting predicted RGB codewords in the plurality of entries in the 3D-LUT into corresponding YCbCr codewords in an YCbCr color space;
dividing the corresponding YCbCr codewords along a Y dimension of the YCbCr color space into a plurality of Y-dimension partitions;
identifying a subset of entries with dark luminance levels among the plurality of entries in the 3D-LUT based on the plurality of Y-dimension partitions of the corresponding YCbCr codewords;
adjusting predicted three-dimensional codewords in the subset of entries in accordance with the dark luminance levels.

EEE17. An apparatus comprising a processor and configured to perform any one of the methods recited in EEE1-EEE16.

EEE18. A non-transitory computer-readable storage medium having stored thereon computer-executable instruction for executing a method with one or more processors in accordance with any of the methods recited in EEE1-EEE16.

EEE19. A computer system configured to perform any one of the methods recited in EEE1-EEE16.

The invention claimed is:

1. A method comprising:
applying guided filtering, with a camera raw image as a guidance image, to a first image of a first dynamic range to generate an intermediate image of the first dynamic range, the first image of the first dynamic range having been generated from the camera raw image with an image signal processor of an image acquisition device;
performing a dynamic range mapping on the intermediate image of the first dynamic range to generate a second image of a second dynamic range different from the first dynamic range;
using the second image of the second dynamic range to generate specific local reshaping function index values for selecting specific local reshaping functions for the second image of the second dynamic range;
applying the specific local reshaping functions to the second image of the second dynamic range to generate a locally reshaped image of the second dynamic range.

2. The method of claim 1, wherein the specific local reshaping function index values collectively form a local reshaping function index value map.

3. The method of claim 1, wherein the first dynamic range represents a standard dynamic range; wherein the second dynamic range represents a high dynamic range.

4. The method of claim 1, wherein each local reshaping function in the specific local reshaping functions represents a hybrid shifted sigmoid function.

5. The method of claim 4, wherein the hybrid shifted sigmoid function is constructed by joining, at a mid-point, a first sigmoid function of a first segment length with a first slope located left to the mid-point and a second sigmoid function of a second segment length with a second slope located right to the mid-point.

6. The method of claim 5, wherein each of the specific local reshaping functions is selected from a family of local reshaping functions; wherein each local reshaping functions in the family of local reshaping functions is indexed with a respective local reshaping function index value in an index value range; wherein each local reshaping functions in the family of local reshaping functions is generated from the hybrid shifted sigmoid function based on a distinct combination of values for the mid-point, the first segment length, the first slope, the second segment length and the second slope.

7. The method of claim 1, wherein the guided filtering includes first guided filtering with a relatively small spatial kernel and second guided filtering with a relatively large spatial kernel.

8. The method of claim 7, wherein the first guided filtering with the relatively small spatial kernel is configured to recover image details, relating to edges, in the camera raw image but lost in the first image; wherein the second guided filtering with the relatively large spatial kernel is configured to recover image details, relating to dark and bright regions, in the camera raw image but lost in the first image.

9. The method of claim 7, wherein the intermediate image is fused from a first guided filtered image generated from the first guided filtering with the relatively small spatial kernel and a second guided filtered image generated from the second guided filtering with the relatively large spatial kernel.

10. The method of claim 9, wherein a smoothened binarized local standard deviation map is generated from the first image; wherein weighting factors used to fuse the first guided filtered image and the second guided filtered image are determined based at least in part on the smoothened binarized local standard deviation map.

11. The method of claim 1, wherein a dynamic range mapping represents a tensor product B-spline (TPB) mapping.

12. The method of claim 1, wherein the dynamic range mapping represents a static mapping specified with optimized operational parameters generated in a model training phase using training images of the first and second dynamic ranges derived from spatially aligning captured images of the first and second dynamic ranges.

13. The method of claim 1, wherein the dynamic range mapping is represented by a three-dimensional lookup table (3D-LUT) that includes a plurality of entries that map input three-dimensional codewords into predicted three-dimensional codewords in a mapped RGB color space; the method further comprising:
    converting predicted RGB codewords in the plurality of entries in the 3D-LUT into corresponding YCbCr codewords in an YCbCr color space;
    dividing the corresponding YCbCr codewords along a Y dimension of the YCbCr color space into a plurality of Y-dimension partitions;
    identifying a subset of entries with dark luminance levels among the plurality of entries in the 3D-LUT based on the plurality of Y-dimension partitions of the corresponding YCbCr codewords;
    adjusting predicted three-dimensional codewords in the subset of entries in accordance with the dark luminance levels.

14. An apparatus comprising a processor and configured to perform the method recited in claim 1.

15. A non-transitory computer-readable storage medium having stored thereon computer-executable instruction which, when executed on one or more processors, cause the one or more processors to perform the method recited in claim 1.

* * * * *